(12) United States Patent
Agrawal et al.

(10) Patent No.: US 8,750,908 B2
(45) Date of Patent: Jun. 10, 2014

(54) QUICK PAGING CHANNEL WITH REDUCED PROBABILITY OF MISSED PAGE

(75) Inventors: Avneesh Agrawal, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1023 days.

(21) Appl. No.: 11/455,071

(22) Filed: Jun. 15, 2006

(65) Prior Publication Data

US 2006/0285485 A1 Dec. 21, 2006

Related U.S. Application Data

(60) Provisional application No. 60/691,901, filed on Jun. 16, 2005, provisional application No. 60/731,037, filed on Oct. 27, 2005.

(51) Int. Cl.
*H04W 68/00* (2009.01)

(52) U.S. Cl.
USPC ........... 455/458; 370/208; 370/260; 370/281; 370/295; 370/302; 375/260

(58) Field of Classification Search
USPC ........... 455/458; 370/208, 260, 281, 295, 302
See application file for complete search history.

(56) References Cited

U.S. PATENT DOCUMENTS

| | | |
|---|---|---|
| 5,021,777 A | 6/1991 | Gross et al. |
| 5,196,728 A | 3/1993 | Jaux |
| 5,267,261 A | 11/1993 | Blakeney, II et al. |
| 5,276,911 A | 1/1994 | Levine et al. |
| 5,289,527 A | 2/1994 | Tiedemann, Jr. |
| 5,363,426 A | 11/1994 | Nyhart |
| 5,406,613 A | 4/1995 | Peponides et al. |
| 5,490,139 A | 2/1996 | Baker et al. |
| 5,640,414 A | 6/1997 | Blakeney, II et al. |
| 5,678,192 A | 10/1997 | Paavonen et al. |
| 5,802,467 A | 9/1998 | Salazar et al. |
| 5,815,507 A | 9/1998 | Vinggaard et al. |
| 5,818,825 A | 10/1998 | Corrigan et al. |
| 5,818,842 A | 10/1998 | Burwell et al. |

(Continued)

FOREIGN PATENT DOCUMENTS

| | | |
|---|---|---|
| CA | 2340201 A1 | 1/2001 |
| CN | 1346580 A | 4/2002 |

(Continued)

OTHER PUBLICATIONS

International Search Report-PCT/US2006/023483, International Search Authority—European Patent Office Dec. 19, 2006.

(Continued)

*Primary Examiner* — Amancio Gonzalez
(74) *Attorney, Agent, or Firm* — Stanton Braden

(57) ABSTRACT

A quick paging channel in a random access wireless communication system includes at least one bit in a quick paging frame identifying the presence of a paging message for an access terminal or group of access terminals. The quick paging bits identifying the presence of a paging message for a first access terminal is encoded with one or more quick paging bits corresponding to one or more additional access terminals to produce one or more forward error correction bits. The jointly encoded quick paging bits are broadcast to the access terminals by time division multiplexing the quick paging frame with additional frames of information.

68 Claims, 8 Drawing Sheets

(56) References Cited

U.S. PATENT DOCUMENTS

| | | |
|---|---|---|
| 5,825,752 A | 10/1998 | Fujimori et al. |
| 5,878,033 A | 3/1999 | Mouly |
| 5,913,168 A | 6/1999 | Moreau et al. |
| 5,946,292 A | 8/1999 | Tsujishita et al. |
| 6,006,073 A | 12/1999 | Glauner et al. |
| 6,012,160 A | 1/2000 | Dent |
| 6,038,220 A | 3/2000 | Kang et al. |
| 6,047,189 A | 4/2000 | Yun et al. |
| 6,088,345 A | 7/2000 | Sakoda et al. |
| 6,115,667 A | 9/2000 | Nakamura |
| 6,118,767 A | 9/2000 | Shen et al. |
| 6,119,005 A | 9/2000 | Smolik |
| 6,128,290 A | 10/2000 | Carvey |
| 6,138,034 A | 10/2000 | Willey |
| 6,144,841 A | 11/2000 | Feeney |
| 6,144,861 A | 11/2000 | Sundelin et al. |
| 6,154,659 A | 11/2000 | Jalali et al. |
| 6,157,621 A | 12/2000 | Brown et al. |
| 6,167,248 A | 12/2000 | Hamalainen et al. |
| 6,169,768 B1 | 1/2001 | Okada et al. |
| 6,175,550 B1 | 1/2001 | Van Nee |
| 6,175,557 B1 | 1/2001 | Diachina et al. |
| 6,181,738 B1 | 1/2001 | Chheda et al. |
| 6,181,768 B1 | 1/2001 | Berliner |
| 6,208,699 B1 | 3/2001 | Chen et al. |
| 6,212,175 B1 | 4/2001 | Harsch |
| 6,216,004 B1 | 4/2001 | Tiedemann, Jr. et al. |
| 6,229,800 B1 | 5/2001 | Thompson et al. |
| 6,249,681 B1 | 6/2001 | Virtanen |
| 6,252,865 B1 | 6/2001 | Walton et al. |
| 6,266,529 B1 | 7/2001 | Chheda |
| 6,272,335 B1 | 8/2001 | Nakayama et al. |
| 6,278,882 B1 | 8/2001 | Choi |
| 6,300,864 B1 | 10/2001 | Willey |
| 6,307,846 B1 | 10/2001 | Willey |
| 6,320,855 B1 | 11/2001 | Shi |
| 6,359,900 B1 | 3/2002 | Dinakar et al. |
| 6,366,779 B1 | 4/2002 | Bender et al. |
| 6,369,447 B2 | 4/2002 | Mori |
| 6,389,034 B1 | 5/2002 | Guo et al. |
| 6,421,540 B1 * | 7/2002 | Gilhousen et al. ............ 455/458 |
| 6,446,236 B1 | 9/2002 | McEwen et al. |
| 6,477,361 B1 | 11/2002 | LaGrotta et al. |
| 6,480,504 B1 | 11/2002 | Wang et al. |
| 6,483,826 B1 | 11/2002 | Akerberg |
| 6,493,338 B1 | 12/2002 | Preston et al. |
| 6,519,705 B1 | 2/2003 | Leung |
| 6,532,227 B1 | 3/2003 | Leppisaari et al. |
| 6,535,736 B1 | 3/2003 | Balogh et al. |
| 6,539,030 B1 | 3/2003 | Bender et al. |
| 6,560,774 B1 | 5/2003 | Gordon et al. |
| 6,563,807 B1 | 5/2003 | Kim et al. |
| 6,570,915 B1 | 5/2003 | Sweitzer et al. |
| 6,571,084 B1 | 5/2003 | Jabbary |
| 6,577,608 B1 * | 6/2003 | Moon et al. .................... 370/311 |
| 6,580,726 B1 | 6/2003 | Kumpf et al. |
| 6,597,705 B1 | 7/2003 | Rezaiifar et al. |
| 6,597,923 B1 | 7/2003 | Vanghi et al. |
| 6,603,746 B1 | 8/2003 | Larijani et al. |
| 6,628,956 B2 | 9/2003 | Bark et al. |
| 6,633,554 B1 | 10/2003 | Dalal |
| 6,643,520 B1 | 11/2003 | Park et al. |
| 6,684,080 B1 | 1/2004 | Barnes et al. |
| 6,687,285 B1 | 2/2004 | Jou |
| 6,711,150 B1 | 3/2004 | Vanghi |
| 6,714,511 B1 | 3/2004 | Sudo et al. |
| 6,721,373 B1 | 4/2004 | Frenkel et al. |
| 6,731,943 B1 | 5/2004 | McCormick et al. |
| 6,754,229 B1 | 6/2004 | Islam et al. |
| 6,788,937 B1 | 9/2004 | Willenegger et al. |
| 6,795,425 B1 | 9/2004 | Raith |
| 6,807,164 B1 | 10/2004 | Almgren et al. |
| 6,813,252 B2 | 11/2004 | Chang et al. |
| 6,813,269 B1 | 11/2004 | Clougherty et al. |
| 6,823,192 B2 | 11/2004 | Jou et al. |
| 6,829,493 B1 | 12/2004 | Hunzinger |
| 6,842,619 B2 | 1/2005 | Lee et al. |
| 6,850,499 B2 | 2/2005 | Wheatley, III et al. |
| 6,928,293 B2 | 8/2005 | Park et al. |
| 6,937,700 B1 | 8/2005 | Jang |
| 6,944,146 B1 | 9/2005 | Barany et al. |
| 6,950,669 B2 | 9/2005 | Simonsson |
| 6,952,591 B2 | 10/2005 | Budka et al. |
| 6,963,540 B2 | 11/2005 | Choi et al. |
| 6,967,936 B1 | 11/2005 | Laroia et al. |
| 6,996,131 B1 | 2/2006 | Islam et al. |
| 6,996,391 B2 | 2/2006 | Hunzinger |
| 7,006,477 B1 | 2/2006 | Balachandran et al. |
| 7,046,966 B2 | 5/2006 | Davis |
| 7,072,307 B2 | 7/2006 | Tong et al. |
| 7,099,299 B2 | 8/2006 | Liang et al. |
| 7,110,391 B1 | 9/2006 | Rogers et al. |
| 7,139,575 B1 | 11/2006 | Chen et al. |
| 7,197,692 B2 | 3/2007 | Sutivong et al. |
| 7,203,512 B2 | 4/2007 | Jeong et al. |
| 7,212,831 B2 | 5/2007 | Lee |
| 7,224,993 B2 | 5/2007 | Meyers et al. |
| 7,233,625 B2 | 6/2007 | Ma et al. |
| 7,313,167 B2 * | 12/2007 | Yoon et al. .................... 375/148 |
| 7,313,398 B1 | 12/2007 | Ramahi |
| 7,320,003 B2 | 1/2008 | Perry et al. |
| 7,336,953 B2 | 2/2008 | Kim et al. |
| 7,340,615 B2 | 3/2008 | Krantz et al. |
| 7,342,901 B1 | 3/2008 | Zhang et al. |
| 7,383,432 B2 | 6/2008 | Barnes et al. |
| 7,403,528 B2 | 7/2008 | Hu et al. |
| 7,415,041 B2 | 8/2008 | Harris |
| 7,420,939 B2 | 9/2008 | Laroia et al. |
| 7,466,665 B2 | 12/2008 | Calcev et al. |
| 7,496,058 B2 | 2/2009 | Kim et al. |
| 7,522,919 B2 | 4/2009 | Yoon et al. |
| 7,567,826 B2 | 7/2009 | Sugaya |
| 7,590,095 B2 | 9/2009 | Chen et al. |
| 7,620,018 B2 | 11/2009 | Tee et al. |
| 7,742,444 B2 | 6/2010 | Mese et al. |
| 7,768,960 B1 | 8/2010 | Barratt |
| 7,782,807 B2 | 8/2010 | Yoon et al. |
| 7,782,831 B1 | 8/2010 | Feeney |
| 7,818,013 B2 | 10/2010 | Li et al. |
| 7,852,793 B2 | 12/2010 | Prakash |
| 7,855,976 B2 | 12/2010 | Sampath |
| 7,881,245 B2 | 2/2011 | Vijayan et al. |
| 7,924,800 B2 | 4/2011 | Sampath |
| 7,933,219 B2 | 4/2011 | Naguib |
| 7,957,483 B2 | 6/2011 | Yu et al. |
| 7,987,505 B2 | 7/2011 | Vadlapudi et al. |
| 8,000,257 B2 | 8/2011 | An et al. |
| 8,000,407 B2 | 8/2011 | Prakash |
| 8,014,749 B2 | 9/2011 | Prakash |
| 8,027,302 B2 | 9/2011 | Prakash et al. |
| 8,032,145 B2 | 10/2011 | Ji |
| 8,036,669 B2 | 10/2011 | Dong et al. |
| 8,078,135 B2 | 12/2011 | Prakash et al. |
| 8,089,893 B2 | 1/2012 | Naguib |
| 8,107,421 B2 | 1/2012 | Prakash et al. |
| 8,169,889 B2 | 5/2012 | Walton et al. |
| 8,265,066 B2 | 9/2012 | Prakash et al. |
| 8,289,908 B2 | 10/2012 | Barriac |
| 8,457,042 B2 | 6/2013 | Prakash et al. |
| 8,457,092 B2 | 6/2013 | Agrawal et al. |
| 8,477,808 B2 | 7/2013 | Prakash et al. |
| 2001/0029181 A1 | 10/2001 | Verkama |
| 2001/0034233 A1 | 10/2001 | Tiedemann, Jr. et al. |
| 2001/0054959 A1 | 12/2001 | Horn et al. |
| 2002/0003780 A1 | 1/2002 | Braun et al. |
| 2002/0018010 A1 | 2/2002 | Le |
| 2002/0018450 A1 | 2/2002 | McKenna et al. |
| 2002/0022487 A1 | 2/2002 | Ahn |
| 2002/0037716 A1 | 3/2002 | McKenna et al. |
| 2002/0058528 A1 | 5/2002 | Hunzinger |
| 2002/0061749 A1 | 5/2002 | Hunzinger |
| 2002/0087720 A1 | 7/2002 | Davis et al. |
| 2002/0093920 A1 | 7/2002 | Neufeld et al. |
| 2002/0101837 A1 | 8/2002 | Bender et al. |

(56) References Cited

U.S. PATENT DOCUMENTS

| | | |
|---|---|---|
| 2002/0111158 A1 | 8/2002 | Tee |
| 2002/0123358 A1 | 9/2002 | Butler et al. |
| 2002/0126641 A1 | 9/2002 | Bender |
| 2002/0136286 A1 | 9/2002 | Koo |
| 2002/0137535 A1 | 9/2002 | Hunzinger |
| 2002/0142776 A1 | 10/2002 | Tiedemann, Jr. |
| 2002/0154610 A1 | 10/2002 | Tiedemann, Jr. et al. |
| 2002/0155852 A1 | 10/2002 | Bender |
| 2002/0163894 A1 | 11/2002 | Alapuranen et al. |
| 2002/0168984 A1 | 11/2002 | Wallentin |
| 2002/0181423 A1 | 12/2002 | Chen et al. |
| 2002/0181509 A1 | 12/2002 | Mody et al. |
| 2003/0016702 A1 | 1/2003 | Bender et al. |
| 2003/0031140 A1* | 2/2003 | Oprescu-Surcobe et al. 370/311 |
| 2003/0039267 A1 | 2/2003 | Koo et al. |
| 2003/0058818 A1 | 3/2003 | Wilkes et al. |
| 2003/0072452 A1 | 4/2003 | Mody |
| 2003/0086366 A1 | 5/2003 | Branlund et al. |
| 2003/0086385 A1 | 5/2003 | Kwon et al. |
| 2003/0112829 A1 | 6/2003 | Sridhar |
| 2003/0115369 A1 | 6/2003 | Walter et al. |
| 2003/0123383 A1 | 7/2003 | Korobkov et al. |
| 2003/0133494 A1 | 7/2003 | Bender et al. |
| 2003/0144000 A1 | 7/2003 | Glazko et al. |
| 2003/0152049 A1 | 8/2003 | Turner |
| 2003/0179727 A1 | 9/2003 | Soong et al. |
| 2003/0189932 A1 | 10/2003 | Ishikawa et al. |
| 2003/0207692 A1 | 11/2003 | Goldberg |
| 2003/0218973 A1 | 11/2003 | Oprea et al. |
| 2003/0232621 A1 | 12/2003 | Brooks |
| 2004/0002340 A1 | 1/2004 | Lim et al. |
| 2004/0038681 A1 | 2/2004 | Chun |
| 2004/0077370 A1 | 4/2004 | Dick et al. |
| 2004/0081131 A1 | 4/2004 | Walton et al. |
| 2004/0082356 A1 | 4/2004 | Walton et al. |
| 2004/0121771 A1 | 6/2004 | Song et al. |
| 2004/0121774 A1 | 6/2004 | Rajkotia et al. |
| 2004/0127244 A1 | 7/2004 | Matsumoto et al. |
| 2004/0143791 A1 | 7/2004 | Ito et al. |
| 2004/0146030 A1 | 7/2004 | Hsieh et al. |
| 2004/0151231 A1 | 8/2004 | Li et al. |
| 2004/0151264 A1 | 8/2004 | Montojo et al. |
| 2004/0152481 A1 | 8/2004 | Georgeaux et al. |
| 2004/0160922 A1 | 8/2004 | Nanda et al. |
| 2004/0174928 A1 | 9/2004 | Siwiak et al. |
| 2004/0180661 A1 | 9/2004 | Chen et al. |
| 2004/0185879 A1 | 9/2004 | Kong et al. |
| 2004/0193971 A1 | 9/2004 | Soong et al. |
| 2004/0203855 A1 | 10/2004 | Veerasamy et al. |
| 2004/0213214 A1 | 10/2004 | Jung et al. |
| 2004/0221218 A1 | 11/2004 | Grob et al. |
| 2004/0229605 A1 | 11/2004 | Hwang et al. |
| 2004/0252659 A1 | 12/2004 | Yun et al. |
| 2004/0258096 A1 | 12/2004 | Yoon et al. |
| 2004/0259528 A1 | 12/2004 | Gandhi et al. |
| 2004/0264548 A1 | 12/2004 | Miyoshi |
| 2005/0002370 A1 | 1/2005 | An et al. |
| 2005/0030911 A1 | 2/2005 | Tiedemann et al. |
| 2005/0031047 A1 | 2/2005 | Maltsev et al. |
| 2005/0047361 A1 | 3/2005 | Fudim et al. |
| 2005/0049013 A1 | 3/2005 | Chang et al. |
| 2005/0054389 A1 | 3/2005 | Lee et al. |
| 2005/0058089 A1 | 3/2005 | Vijayan et al. |
| 2005/0063298 A1 | 3/2005 | Ling et al. |
| 2005/0078641 A1 | 4/2005 | Kim |
| 2005/0094576 A1 | 5/2005 | Fonseca et al. |
| 2005/0111397 A1 | 5/2005 | Attar et al. |
| 2005/0111406 A1 | 5/2005 | Pasanen et al. |
| 2005/0113023 A1 | 5/2005 | Bassompiere et al. |
| 2005/0117537 A1 | 6/2005 | Okabe |
| 2005/0118981 A1 | 6/2005 | Laroia et al. |
| 2005/0124358 A1 | 6/2005 | Willey |
| 2005/0124362 A1 | 6/2005 | Pecen et al. |
| 2005/0128964 A1 | 6/2005 | Tiedemann et al. |
| 2005/0128993 A1 | 6/2005 | Yu et al. |
| 2005/0135282 A1 | 6/2005 | Miyoshi et al. |
| 2005/0135308 A1 | 6/2005 | Vijayan et al. |
| 2005/0135403 A1 | 6/2005 | Ketchum et al. |
| 2005/0152328 A1 | 7/2005 | Sadri et al. |
| 2005/0157802 A1 | 7/2005 | Park et al. |
| 2005/0163258 A1 | 7/2005 | Gore et al. |
| 2005/0164709 A1 | 7/2005 | Balasubramanian et al. |
| 2005/0165949 A1 | 7/2005 | Teague |
| 2005/0180312 A1 | 8/2005 | Walton et al. |
| 2005/0180362 A1 | 8/2005 | Chin et al. |
| 2005/0190724 A1 | 9/2005 | Hansen et al. |
| 2005/0201309 A1 | 9/2005 | Kang et al. |
| 2005/0221833 A1 | 10/2005 | Granzow et al. |
| 2005/0232181 A1 | 10/2005 | Park et al. |
| 2005/0233729 A1 | 10/2005 | Stojanovski et al. |
| 2005/0249181 A1 | 11/2005 | Vijayan et al. |
| 2005/0249187 A1 | 11/2005 | Cho et al. |
| 2005/0265346 A1 | 12/2005 | Ho et al. |
| 2005/0266846 A1 | 12/2005 | Kim |
| 2005/0271027 A1 | 12/2005 | Kim et al. |
| 2005/0281226 A1 | 12/2005 | Lee et al. |
| 2005/0281269 A1 | 12/2005 | Choi |
| 2006/0014542 A1 | 1/2006 | Khandekar et al. |
| 2006/0018249 A1 | 1/2006 | Shearer et al. |
| 2006/0019677 A1 | 1/2006 | Teague et al. |
| 2006/0019694 A1 | 1/2006 | Sutivong et al. |
| 2006/0034208 A1 | 2/2006 | Blouin |
| 2006/0034244 A1 | 2/2006 | Huang et al. |
| 2006/0046762 A1 | 3/2006 | Yoon et al. |
| 2006/0050637 A1 | 3/2006 | Wigard et al. |
| 2006/0062183 A1 | 3/2006 | Forte et al. |
| 2006/0084432 A1 | 4/2006 | Balasubramanian et al. |
| 2006/0098599 A1 | 5/2006 | Choi et al. |
| 2006/0099972 A1 | 5/2006 | Nair et al. |
| 2006/0129816 A1 | 6/2006 | Hinton |
| 2006/0133409 A1 | 6/2006 | Prakash et al. |
| 2006/0148493 A1* | 7/2006 | Narasimha et al. ........... 455/458 |
| 2006/0183483 A1 | 8/2006 | Hidaka |
| 2006/0187877 A1 | 8/2006 | Lundby et al. |
| 2006/0193287 A1 | 8/2006 | Ooshima et al. |
| 2006/0194581 A1 | 8/2006 | Kang et al. |
| 2006/0205413 A1 | 9/2006 | Teague |
| 2006/0223449 A1 | 10/2006 | Sampath et al. |
| 2006/0227891 A1 | 10/2006 | Niu et al. |
| 2006/0245425 A1 | 11/2006 | Mathis et al. |
| 2006/0268768 A1 | 11/2006 | Harris et al. |
| 2006/0280160 A1 | 12/2006 | Padovani et al. |
| 2006/0285558 A1 | 12/2006 | Dottling et al. |
| 2006/0286974 A1 | 12/2006 | Gore et al. |
| 2006/0291577 A1 | 12/2006 | Boariu |
| 2007/0003113 A1 | 1/2007 | Goldberg et al. |
| 2007/0015523 A1 | 1/2007 | Prakash et al. |
| 2007/0022441 A1 | 1/2007 | Nystrom et al. |
| 2007/0060126 A1 | 3/2007 | Taniguchi et al. |
| 2007/0064588 A1 | 3/2007 | Kisoda et al. |
| 2007/0076682 A1 | 4/2007 | Kim et al. |
| 2007/0087767 A1 | 4/2007 | Pareek et al. |
| 2007/0091817 A1 | 4/2007 | Yoon et al. |
| 2007/0097935 A1 | 5/2007 | Gorokhov et al. |
| 2007/0110000 A1 | 5/2007 | Abedi |
| 2007/0121535 A1 | 5/2007 | Chen et al. |
| 2007/0133476 A1 | 6/2007 | Li et al. |
| 2007/0147226 A1 | 6/2007 | Khandekar et al. |
| 2007/0159957 A1 | 7/2007 | Ljung et al. |
| 2007/0217387 A1 | 9/2007 | Choi et al. |
| 2008/0056183 A1 | 3/2008 | Gorokhov et al. |
| 2008/0056188 A1 | 3/2008 | Lu et al. |
| 2008/0076432 A1 | 3/2008 | Senarath et al. |
| 2008/0117842 A1 | 5/2008 | Rao |
| 2008/0123542 A1 | 5/2008 | Karlsson |
| 2008/0187064 A1 | 8/2008 | Miyoshi |
| 2008/0188214 A1 | 8/2008 | Qi |
| 2008/0259811 A1 | 10/2008 | Cordeiro et al. |
| 2008/0271138 A1 | 10/2008 | Chen et al. |
| 2008/0293421 A1 | 11/2008 | Ulupinar et al. |
| 2008/0310357 A1 | 12/2008 | Ulupinar et al. |
| 2008/0311908 A1 | 12/2008 | Prakash et al. |
| 2009/0034445 A1 | 2/2009 | Prakash et al. |
| 2009/0046640 A1 | 2/2009 | Prakash et al. |

(56) References Cited

U.S. PATENT DOCUMENTS

| | | |
|---|---|---|
| 2009/0046699 A1 | 2/2009 | Prakash |
| 2009/0067547 A1 | 3/2009 | Ulupinar et al. |
| 2009/0086758 A1 | 4/2009 | Prakash et al. |
| 2009/0097437 A1 | 4/2009 | Sutivong et al. |
| 2009/0098841 A1 | 4/2009 | Prakash et al. |
| 2009/0103507 A1 | 4/2009 | Gu et al. |
| 2009/0129325 A1 | 5/2009 | Prakash et al. |
| 2009/0135768 A1 | 5/2009 | Barriac |
| 2009/0147693 A1 | 6/2009 | Teague et al. |
| 2009/0147712 A1 | 6/2009 | Prakash et al. |
| 2009/0147713 A1 | 6/2009 | Prakash |
| 2009/0147729 A1 | 6/2009 | Ulupinar et al. |
| 2009/0147730 A1 | 6/2009 | Ulupinar et al. |
| 2009/0147739 A1 | 6/2009 | Barriac |
| 2009/0149172 A1 | 6/2009 | Prakash et al. |
| 2009/0156207 A1 | 6/2009 | Prakash |
| 2009/0161775 A1 | 6/2009 | Prakash et al. |
| 2009/0164609 A1 | 6/2009 | Prakash et al. |
| 2009/0164658 A1 | 6/2009 | Prakash |
| 2009/0175217 A1 | 7/2009 | Prakash |
| 2009/0180424 A1 | 7/2009 | Prakash et al. |
| 2009/0201833 A1 | 8/2009 | Khandekar |
| 2009/0207744 A1 | 8/2009 | Ulupinar et al. |
| 2009/0207790 A1 | 8/2009 | Ulupinar et al. |
| 2009/0207830 A1 | 8/2009 | Prakash |
| 2009/0213788 A1 | 8/2009 | Prakash et al. |
| 2009/0213789 A1 | 8/2009 | Khandekar et al. |
| 2009/0213790 A1 | 8/2009 | Barriac |
| 2009/0213791 A1 | 8/2009 | Prakash |
| 2009/0219840 A1 | 9/2009 | Barriac |
| 2009/0219845 A1 | 9/2009 | Prakash |
| 2009/0219857 A1 | 9/2009 | Barriac et al. |
| 2009/0219866 A1 | 9/2009 | Prakash et al. |
| 2009/0219867 A1 | 9/2009 | Barriac |
| 2009/0219887 A1 | 9/2009 | Barriac |
| 2009/0219917 A1 | 9/2009 | Prakash et al. |
| 2009/0220033 A1 | 9/2009 | Palanki et al. |
| 2009/0221305 A1 | 9/2009 | Ulupinar et al. |
| 2009/0222698 A1 | 9/2009 | Prakash et al. |
| 2009/0258648 A1 | 10/2009 | Willey |
| 2009/0303890 A1 | 12/2009 | Prakash |
| 2009/0305664 A1 | 12/2009 | Prakash |
| 2009/0316632 A1 | 12/2009 | Prakash |
| 2010/0002597 A1 | 1/2010 | Sampath et al. |
| 2010/0034101 A1 | 2/2010 | Ayman Naguib |
| 2010/0046423 A1 | 2/2010 | Prakash et al. |
| 2010/0069107 A1 | 3/2010 | Mese et al. |
| 2010/0110976 A1 | 5/2010 | Prakash et al. |
| 2010/0150106 A1 | 6/2010 | Barriac |
| 2010/0215030 A1 | 8/2010 | Agrawal et al. |
| 2010/0232293 A1 | 9/2010 | Sagfors et al. |
| 2011/0173464 A1 | 7/2011 | Prakash et al. |
| 2011/0199996 A1 | 8/2011 | Zhang et al. |
| 2011/0280183 A1 | 11/2011 | Sampath |
| 2013/0010755 A1 | 1/2013 | Barriac |

FOREIGN PATENT DOCUMENTS

| | | |
|---|---|---|
| CN | 1350730 A | 5/2002 |
| CN | 1666448 A | 9/2005 |
| EP | 0475698 A2 | 3/1992 |
| EP | 0687078 A2 | 12/1995 |
| EP | 0869647 A2 | 10/1998 |
| EP | 0955736 A2 | 11/1999 |
| EP | 1052866 | 11/2000 |
| EP | 1124347 A2 | 8/2001 |
| EP | 1158685 A1 | 11/2001 |
| EP | 1202591 A2 | 5/2002 |
| EP | 1 223 775 | 7/2002 |
| EP | 1315310 A2 | 5/2003 |
| EP | 1388964 A1 | 2/2004 |
| EP | 1458209 A2 | 9/2004 |
| EP | 1471760 | 10/2004 |
| EP | 1487230 | 12/2004 |
| EP | 1496632 A1 | 1/2005 |
| EP | 1513282 A2 | 3/2005 |
| EP | 1534039 | 5/2005 |
| EP | 1004217 | 6/2005 |
| EP | 1583309 A2 | 10/2005 |
| EP | 1587233 | 10/2005 |
| EP | 1678906 | 7/2006 |
| EP | 1714416 | 10/2006 |
| EP | 1949730 | 7/2008 |
| JP | 0722998 | 1/1995 |
| JP | 7504552 T | 5/1995 |
| JP | 7226724 A2 | 8/1995 |
| JP | 8172671 | 7/1996 |
| JP | 8242218 A | 9/1996 |
| JP | 9509547 | 9/1997 |
| JP | 10155179 A | 6/1998 |
| JP | 10242903 A | 9/1998 |
| JP | 11313370 A | 11/1999 |
| JP | 2000506343 A | 5/2000 |
| JP | 2000232688 A | 8/2000 |
| JP | 2001512638 T | 8/2001 |
| JP | 2001274767 | 10/2001 |
| JP | 2002010341 A | 1/2002 |
| JP | 2002026795 A | 1/2002 |
| JP | 2002152129 A | 5/2002 |
| JP | 2002158609 A | 5/2002 |
| JP | 2002300628 | 10/2002 |
| JP | 2002305534 A | 10/2002 |
| JP | 2002539707 | 11/2002 |
| JP | 2002540692 | 11/2002 |
| JP | 2003500891 T | 1/2003 |
| JP | 2003110582 A | 4/2003 |
| JP | 2003517741 T | 5/2003 |
| JP | 2003524328 | 8/2003 |
| JP | 2003525555 | 8/2003 |
| JP | 2003309533 | 10/2003 |
| JP | 2004088180 A | 3/2004 |
| JP | 2004153619 A | 5/2004 |
| JP | 2004159235 | 6/2004 |
| JP | 2004517534 T | 6/2004 |
| JP | 2004247801 A | 9/2004 |
| JP | 2004247985 A | 9/2004 |
| JP | 2004530347 | 9/2004 |
| JP | 2004531124 | 10/2004 |
| JP | 2004532542 A | 10/2004 |
| JP | 2004328772 | 11/2004 |
| JP | 2005012806 A | 1/2005 |
| JP | 2005502218 T | 1/2005 |
| JP | 2005080312 A | 3/2005 |
| JP | 2005508588 | 3/2005 |
| JP | 2005101990 A | 4/2005 |
| JP | 2005514865 T | 5/2005 |
| JP | 2005160079 A | 6/2005 |
| JP | 2005233621 A | 9/2005 |
| JP | 2005286998 A | 10/2005 |
| JP | 2006523392 A | 10/2006 |
| JP | 2007501580 T | 1/2007 |
| JP | 4746096 | 5/2011 |
| KR | 20010016706 | 3/2001 |
| KR | 1020010082061 | 8/2001 |
| KR | 1020030007481 | 1/2003 |
| KR | 20040007214 | 1/2004 |
| KR | 20040050145 | 6/2004 |
| KR | 200553787 | 6/2005 |
| KR | 20060014618 A | 2/2006 |
| RU | 2073913 C1 | 2/1997 |
| RU | 2198465 C2 | 2/2003 |
| TW | 478269 | 3/2002 |
| TW | 531982 | 5/2003 |
| TW | 200302642 | 8/2003 |
| TW | I223532 | 11/2004 |
| TW | I223944 | 11/2004 |
| TW | 200501641 | 1/2005 |
| TW | I239782 | 9/2005 |
| TW | I240524 | 9/2005 |
| WO | WO9318601 A1 | 9/1993 |
| WO | WO9730531 A1 | 8/1997 |
| WO | WO9733399 A1 | 9/1997 |
| WO | WO9835520 | 8/1998 |

(56) References Cited

FOREIGN PATENT DOCUMENTS

| | | |
|---|---|---|
| WO | WO9839938 A2 | 9/1998 |
| WO | WO9848581 A1 | 10/1998 |
| WO | WO9854919 A2 | 12/1998 |
| WO | WO98054919 | 12/1998 |
| WO | WO9943101 A1 | 8/1999 |
| WO | WO0007260 A2 | 2/2000 |
| WO | WO0010353 A1 | 2/2000 |
| WO | WO0013451 | 3/2000 |
| WO | WO0014900 | 3/2000 |
| WO | WO0018173 | 3/2000 |
| WO | WO0035107 | 6/2000 |
| WO | WO0055976 A2 | 9/2000 |
| WO | WO0057662 | 9/2000 |
| WO | WO0057663 | 9/2000 |
| WO | WO0113669 A1 | 2/2001 |
| WO | WO0117288 A1 | 3/2001 |
| WO | WO0120808 A2 | 3/2001 |
| WO | WO 01/60104 | 8/2001 |
| WO | WO0176110 A2 | 10/2001 |
| WO | WO0176279 | 10/2001 |
| WO | WO0182504 A1 | 11/2001 |
| WO | WO 01/97538 | 12/2001 |
| WO | WO0228120 A2 | 4/2002 |
| WO | WO 02/43412 | 5/2002 |
| WO | WO0247321 | 6/2002 |
| WO | WO0249305 | 6/2002 |
| WO | WO02073867 | 9/2002 |
| WO | WO02080600 A1 | 10/2002 |
| WO | WO02093839 | 11/2002 |
| WO | WO03015435 | 2/2003 |
| WO | WO03043251 | 5/2003 |
| WO | WO03051076 | 6/2003 |
| WO | WO03069933 | 8/2003 |
| WO | WO2004004173 | 1/2004 |
| WO | WO2004032548 A1 | 4/2004 |
| WO | WO2004032559 | 4/2004 |
| WO | WO2004038984 A2 | 5/2004 |
| WO | WO2004038988 | 5/2004 |
| WO | WO2004054206 A1 | 6/2004 |
| WO | WO2004073200 | 8/2004 |
| WO | WO2004077752 | 9/2004 |
| WO | WO2004077778 A1 | 9/2004 |
| WO | WO2004079949 A1 | 9/2004 |
| WO | WO2004082181 A1 | 9/2004 |
| WO | WO2004086711 | 10/2004 |
| WO | WO2004091231 | 10/2004 |
| WO | WO2004100450 A1 | 11/2004 |
| WO | WO2004107796 | 12/2004 |
| WO | WO2005004525 | 1/2005 |
| WO | WO2005022811 | 3/2005 |
| WO | WO2005027355 A2 | 3/2005 |
| WO | WO2005034438 | 4/2005 |
| WO | WO2005039128 | 4/2005 |
| WO | WO2005041515 | 5/2005 |
| WO | WO-2005048517 A1 | 5/2005 |
| WO | WO2005055640 A1 | 6/2005 |
| WO | WO2005060277 | 6/2005 |
| WO | WO2005064875 | 7/2005 |
| WO | WO2005067173 A1 | 7/2005 |
| WO | WO2005067181 A1 | 7/2005 |
| WO | WO2005071989 | 8/2005 |
| WO | WO2005074184 | 8/2005 |
| WO | WO2005079081 A1 | 8/2005 |
| WO | WO2005081444 A1 | 9/2005 |
| WO | WO2005096560 A1 | 10/2005 |
| WO | WO2006007318 A1 | 1/2006 |
| WO | WO2006023705 | 3/2006 |
| WO | 2006069176 A2 | 6/2006 |
| WO | WO2006069320 | 6/2006 |
| WO | WO2006099062 A1 | 9/2006 |
| WO | 2006109492 | 10/2006 |
| WO | WO2006138556 A2 | 12/2006 |
| WO | WO2006138573 | 12/2006 |
| WO | WO2007050876 | 5/2007 |
| WO | WO2007050939 | 5/2007 |
| ZW | 02806178 | 7/2006 |

OTHER PUBLICATIONS

Written Opinion—PCT/US2006/023483, International Search Authority—European Patent Office—Dec. 19, 2006.
International Preliminary Report on Patentability—PCT/US2006/023483, International Bureau of WIPO—Geneva Switzerland—Dec. 17, 2007.
Damnjanovic and Vanghi, "IS-2000 Enhanced Closed Loop Power Control for Turbo Coding," IEEE 54th Vehicular Technology Proceedings, Oct. 7-11, 2001, pp. 2314-2318, XP-010562383.
EP Office Action for European Patent Application 06836548.5 dated Mar. 3, 2010; pp. 4.
European OA dated May 14, 2009 for U.S. Application Serial No. 06 826 883.8 -1237, 4 pages.
European OA dated May 14, 2009 for EP Application Serial No. 06827064.4 -1237, 4 pages.
European Office Action Dated Aug. 21, 2008 for European Application Serial No. 06827178.2, 3 pages.
International Search Report—PCT/US2006/009549, International Search Authority—European Patent Office—Jun. 20, 2006.
International Search Report and Written Opinion PCT/US2006/042032, International Search Authority—European Patent Office—Mar. 21, 2007.
International Search Report and Written Opinion—PCT/US2006/041869, International Search Authority—European Patent Office—Mar. 6, 2007.
International Search Report and Written Opinion—PCT/US2006/041931, International Search Authority—European Patent Office—Feb. 16, 2007.
International Search Report and Written Opinion—PCT/US2006/041982, International Search Authority—European Patent Office—May 24, 2007.
International Search Report and Written Opinion—PCT/US2006/042226, International Search Authority—European Patent Office—Feb. 26, 2007.
International Search Report and Written Opinion—PCT/US2006/042493, International Search Authority—European Patent Office—Mar. 12, 2007.
International Search Report and Written Opinion—PCT/US2006/060337, International Search Authority—European Patent Office—Mar. 29, 2007.
International Search Report and Written Opinion—PCT/US2006/042488 International Search Authority—European Patent Office—Mar. 21, 2007.
International Search Report and Written Opinion—PCT/US2006/041945, International Search Authority—European Patent Office—Mar. 21, 2007.
International Search Report and Written Opinion—PCT/US2006/042302, International Search Authority—European Patent Office—Mar. 14, 2007.
International Search Report and Written Opinion PCT/US2006/041971—International Search Authority—European Patent Office—Sep. 7, 2007.
International Search Report—PCT/US2006/041981—Mar. 12, 2007 11 Pages.
International Search Report for PCT/US2006/041933, Mar. 14, 2007, 3 Pages.
International Search Report mailed Feb. 28, 2007 for International Patent Application Serial No. PCT/US2006/042023, 18 pages.
International Search Report mailed Mar. 6, 2007 for PCT Application No. PCT/US2006/041908, 2 Pages.
International Search Report—PCT/US2006/023587—International Search Authority—Jan. 11, 2007.
Korean OA Dated Nov. 25, 2009 for KR Application Serial No. 20087012719, 4 Pages.
Korean Office Action Dated April 30,2010 for Korean Application Serial No. 2008-7012462, 3 Pages.
Korean Office Action Dated March 19,2010,for Korean Patent Application Serial No. 2008-7012456, 4 Pages.

(56) References Cited

OTHER PUBLICATIONS

Korean Office Action Dated March 30, 2010 for Korean Patent , Application Serial No. 2008/7012610, 3 Pages.
Korean Office Action for Korean Patent Application 2008-7012453 dated Jan. 27, 2010; pp. 3.
Korowajczuk L., et al, "Designing cdma2000 Systems", John Wiley & Sons, Inc., 2004, 34 pages.
OA dated Dec. 29, 2008 for European Application Serial No. 06826840.8, 3 pages.
OA mailed Feb. 26, 2010 for Korean Patent Application Serial No. 2008-7012649, 3 pages.
OA mailed Aug. 31, 2010 for Korean Patent Application Serial No. 2008-7012649, 3 pages.
Office Action mailed Mar. 15, 2010 for Korean Patent Application No. 20087012580, 3 pages.
Office Action mailed Jun. 9, 2010 for Korean Patent Application No. 20087012580, 3 pages.
Office Action mailed Jan. 26, 2010 for Korean Patent Application No. 2008-7012457, 3 pages.
Office Action mailed Feb. 26, 2010 for Korean Patent Application No. 2008-7012604, 4 Pages.
Office Action mailed Aug. 2, 2010 for European Patent Application No. 06827064, 8 pages.
Taiwanese Search Report—TW095108906—Search Authority—TIPO—Feb. 1, 2009.
Tomcik, Jim "MBFF and MBTDD Wideband Mode: Technology Overview" IEEE802.80 Working Group or Mobile Broadband Wireless Access, Jan. 2006, pp. 1-79.
U.S. Appl. No. 60/731,037, filed Oct. 27, 2005, entitled "Methods and Apparatus for Providing Mobile Broadband Wireless Higher Mac", 148 pages.
Written Opinion—PCT/US06/009549, International Search Authority—European Patent Office—Jun. 20, 2006.
Written Opinion—PCT/US2006/041908, International Search Authority, European Patent Office, Mar. 6, 2007.
Written Opinion—PCT/US2006/041933, International Search Authority, European Patent Office, Mar. 14, 2007.
Written Opinion—PCT/US2006/041981, International Search Authority, European Patent Office, Mar. 12, 2007.
Written Opinion—PCT/US2006/042023, International Search Authority, European Patent Office, Feb. 28, 2007.
Written Opinion—PCT/US06/023587—International Search Authority/US—Jan. 11, 2007.
3GPP C. S0024-A: cdma2000 High Rate Packet Data Air Interface Specification 3rd Generation Partnership Project 2, 3GPP2, [Online] Jul. 2005, pp. 8-76-8-162, XP002428084.
3GPP, ETSI: Universal Mobile Telecommunications system (UMTS); Radio Resource Control (RRC); Protocol specification (3GPP TS 25.331 version 7.2.0 Release 7). ETSI TS 125 331 V.7.2.0, Sep. 2006, XP002423759.
3GPP2—3rd Generation Partnership Project 2. "cdma2000 High Rate Packet Air Interface Specification" 3GPP2 C. S0024-A Version 2.0, Jul. 2005, XP002428850. Published online at [http://www.3gpp2.org/Public_html/specs/C . S0024-A_v2.0_050727.pdf], retrieved on May 19, 2009. 1227 pages.
3GPP2—3rd Generation Partnership Project 2. "cdma2000 High Rate Packet Data Air Interface Specification", C.S0024-A, Version 2.0, Jul. 2005, 1227 pages. XP002431799.
3GPP2 "cdma2000 High Rate Packet Data Air interface Specification",3rd Generation Partnershif Project 2 C.S0024, Sep. 12, 2000.
3GPP2 C. 50024-A: "cdma2000 High Rate Packet Data Air Interface Specification", Version 2.0, 3rd Generation Partnership Project 2 3GPP2, [Online] Jul. 2005, pp. 8-78-8-84, XP002425979 Retrieved from the Internet: URL: http://www .3gpp2.org/Public_html / specs/>.
3GPP C: "cdma2000 High Rate Packet Data 1-9, Air Interface Specification; 3GPP2, C.S0024-A version 2.0," 3GPP2 CDMA2000, Jul. 2005, XP002425687.
3GPP2 C: "cdma2000 High Rate Packet Data Air Interface Specification; 3GPP2 C. S0024-A version 2.0," 3GPP2 CDMA2000, May 2006, 1621 pages, XP002426056.
3GPP2 C: "cdma2000 High Rate Packet Data Air Interface Specification; 3GPP2 C.S0024-A version 2.0," 3GPP2 CDMA2000, Jul. 2005, p. 0, 5-28-5-30,8-101-8-103, 9-106, XP002426414.
3GPP2 C: "cdma2000 High Rate Packet Data Air Interface Specification; 3GPP2 C.S0024-A version 2.0," 3GPP2 CDMA2000, Jul. 2005, p. 0, 8-11-8-12,8-29-8-32,846-8-87, 8-101, XP002426182.
3GPP2 C: "cdma2000 High Rate Packet Data Air Interference Specification; 3GPP2C.S0024-A version 2.0" 3GPP2 CDMA2000 Jul. 2005, XP002425754.
3GPP2 C: "cdma2000 High Rate Packet Data Air Interface Specification; 3GPP2 C.S0024-A version 1.0," 3GPP2, Mar. 2004, p. 0, 9-85, XP002427173.
3GPP2 C: cdma2000 High Rate Packet Data Air Interface Specification; 3GPP2 C.S0024-A version 2.0, CDMA2000, Jul. 2005, p. 0, 8-98,8-106, 8-120-8-121, XP002427172.
3GPP2. "cdma2000 High Rate Packet Data Air Interface Specification", Chapter 9-"Connection Layer", C.S0024-A, Version 1.0, Mar. 2004, 144 pages, XP002424014.
3GPP2, "cdma2000 High Rate Packet Data Air Interface Specification", C. S0024-A Version 2.0, Oct. 27, 2000, 441 pages.
3GPP2, "cdma2000 High Rate Packet Data Air Interface Specification", C.S0024-A Version 2.0, Jul. 2005, 24 pages. XP002429569.
3GPP2 C.S0024: "cdma2000 High Rate Packet Data Air Interface Specification" 3GPP Standards, Sep. 12, 2000, XP002206456.
3GPP2 C.S0024-0-v4.0 "cdma2000 High Rate Packet Data Air Interface Specification" Oct. 25,2002.
3GPP2, Medium Access Control (MAC) Standard for cdma2000 Spread Spectrum Systems, Release D, C.SO003-D Version 2.0, Sep. 2005, 4 pages. XP002429570.
3GPP2: "cdma2000 High rate packet data air interface specification" 3GPP2 C.S0024, [Online] Oct. 27, 2000, pp. 6-29-6-31, XP002423350 Retrieved from the Internet: URL: http://www. 3gpp2.org/public-html/specs /C.S0024_v2.0.pdf.
3GPP2: "CDMA2000 high rate packet data air interface specification" 3GPP2 C.S0024-A, Jun. 2006, p. 10-30-1 0-80, XP002424373. http://www.3gpp2.org/Public~html/specs/C.S0024-Av2.0050727.pdf. Last accessed on Mar. 12, 2007.
3GPP2: "CDMA2000 High Rate Packet Data Air Interface Specification; 3GPP2 C.S0024-A, Version 2.0" 3rd Generation Partnership Project 2 3GPP2, XX, XX, Jul. 2005, pp. 8-154-8-165, XP002424136.
3GPP2: "CDMA2000 High Rate Packet Data Air Interface Specification; 3GPP2 C.S0024-A, Version 2.0" 3rd Generation Partnership Project 2 3GPP2, XX, XX, Jul. 2005, pp. 8-170, XP002436091 p. 8-152; 8.9.2.3 Public Data; pp. 8-155 and 8-156; 8.9.6.1.4 Access Network Requirements; 8.9.6.1.4 Access Terminal Requirements; p. 8-157; 8.9.6.1.6.1.2 Supervision o f SectorParameters Message.
3GPP2: "CDMA2000 High Rate Packet Data Air Interface Specification; 2GPP2 C.SO024-A, Version 2.0, pp. 1-4-1-5 and 8-71-8-80" 3GPP2, Jul. 2005, XP002429844.
3GPP2: "coma 2000 High Rate Packet Data Air Interface Specification" 3GPP2 C. S0024, version 2.0, pp. 8-21-8-28, XP002423051, section 8.3.6.1.3. http://www.3gpp2.org/public_html/specs/C.S0024_v2.0.pdf. Last accessed May 23, 2008, 441 pages.
3GPP2: "C.s0024-A: cdma2000 High Rate Packet Data Air Interface Specification" Jul. 2005, pp. 1, 8/29-8/40, XP002423333. http://www.3gpp2.org/Public_htrnl/specs/C.S0024-A_v2.0_050727.pdf. Last accessed Jul. 18, 2008, 13 pages.
3GPP2: "C.S0024-A: CDMA2000 High Rate Packet Data Air Interface Specification". 3rd Generation Partnership Project, Jul. 2005, pp. 1, 8/54-8/56-8/68, XP002423049.
3GPP2: "cdma 2000 High Rate Packet Data Air Interface Specification" 3GPP2 C. S0024, version 2.0, Jul. 2005, p. 0, 8-151 para8.9, 8-154para8.9.6.1, 8-155para8.9.6.1.2, 8.9.6.1.2.1, 8.9.6.1.2.2,XP002424076, http://www.3gpp2.org/public~html/specs/C.S0024_v20pdf Last accessed May 23, 2008, 441 pages.
3GPP2: "cdma 2000 High Rate Packet Data Air Interface Specification" 3GPP2 C. S0024, version 2.0, pp. 482-532, 1179, XP002423741, paragraphs 8.7.6.1.6.6-8.7.6.1.6.7, para 8.7.6.2.3.

(56) References Cited

OTHER PUBLICATIONS http://www.3gpp2.org/public_html/specs/C.S0024 v 2.0pdf Last accessed May 23, 2008, 441 pages.
3rd Generation Partnership Project 2 "3GPP2": "CDMA2000 High Rate Packet Data Air Interface Specification". 3GPP2 C.S0024-A Version 2.0, Jul. 2005, pp. 7-18, XP002423355.
3rd Generation Partnership Project 2 "3GPP2" : "CDMA2000 High Rate Packet Data Air Interface Specification". 3GPP2 C.SO024-A Version 2.0, Jul. 2005, pp. 1-1-1-12, XP002423354.
3rd Generation Partnership Project 2 "3GPP2": "CDMA2000 High Rate Packet Data Air Interface Specification".3GPP2 C.S0024-A Version 2.0, Jul. 2005, pp. 8-81-8-106, XP002423353.
3rd Generation Partnership Project 2 "3GPP2" "cdma200 High Rate Packet Data Air Interface Specification" 3GPP2 C.S0024-A Version 2.0, Jul. 2005, XP002427508.
3rd Generation Partnership Project 2 "3GPP2", cdma2000 High Rate Packet Data Air Interface Specification (Jul. 2005).
3rd Generation Partnership Project 2 "3GPP2". CDMA2000 High Rate Packet Data Air Interface Specification. 3GPP2 C.S0024-A, Version 2.0 Jul. 2005, pp. 3-5 to 3-11, XP02424183 www.3gpp2. orglpublic~html/specs/tsgc.cfmL. ast accessed Mar. 5, 2007.
3rd Generation Partnership Project 2 "3gPP2": "cdma200 High Rate Packet Data Air Interface Specification" 3GPP2 C.S0024-A, Version 2.0, Jul. 2005, XP002426687.
"3rd Generation Partnership Project 2 3GPP2: "cdma2000 High Rate Packet Data Air Interface Specification"".
3rd Generation Partnership Project 2 3GPP2: "cdma2000 High Rate Packet Data Air Interface Specification; 3GPP2 C .S0024-A Version 2.0" [Online] Jul. 2005, pp. 8-5-8-20, XP002423185.
3rd Generation Partnership Project 2 "3GPP2": "cdma2000 High Rate Packet Data Air Interface Specification" 3GPP2 CS0024-A Version 20, Jul. 2005, XP002429115.
3rd Generation Partnership Project 2 "3GPP2": "cdma2000 High Rate Packet Data Air Interface Specification" 3GPP2 C.S0024-A Version 2.0, Jul. 2005, XP002430079.
3rd Generation Partnership Project 2 3GPP2: "cdma2000 High Rate Packet Data Air Interface Specification" 3GPP2 C.S0024-A Version 2.0, Jul. 2005, XP002428039.
3rd Generation Partnership Project 2 "3GPP2": "CDMA2000 High Rate Packet Data Air Interface Specification; 3GPPS C.S0024-A Version 2.0". Jul. 2005, pp. 8-29-8-45,XP002423079.http://www. 3gpp2.wrg/public_html/specs/tsgc.cfm.
3rd Generation Partnership Project 2 "3GPP2": Medium Access Control (MAC) Standard for cdma2000 Spread Spectrum Systems, Release D'3GPP2 CS0003-D Version 20, Sep. 2005 XP002429116.
3rd Generation Partnership Project 2 "3GPP2": "Signaling Link Access Control (LAC) Standard for cdma200 Spread Spectrum Systems Revision D v2.0" 3GPP2 C.S0004-D Version 2.0, Sep. 2005, XP002427509, pp. 1-12, pp. 2-46-pp. 2-51.
Agilent Technologies: Performing Base Station Over—Air Maintenance with the Agilent E6474A CDMA, Mar. 2002, XP002423351, retrieved from the internet on Mar. 6, 2007, pp. 16-17, 23. http://cp.literature.agilent.com/litweb/pdf/E6474-90042.pdf. Last accessed May 23, 2008, 33 pages.
An enhanced channel-quality indication (CQI) reporting scheme for HSDPA systems, Soo-Yong Jeon, Dong-Ho Cho IEEE, May 2005, vol. 9, pp. 432-434.
Chinese Office Action dated Sep. 6, 2010, for Chinese Patent Application Serial No. 200680049310.6, 5 pages.
Chinese Office action mailed Sep. 8, 2010 for Chinese patent application No. 200680049451.8, 2 pages.
English Translation of Korean Office Action mailed Aug. 31, 2010 for Korean Patent Application No. 2008-7012604, 3 pages.
English Translation of the Chinese Office Action dated Aug. 31, 2010 for Chinese Patent Application Serial No. 2006-80049431.0, 2 pages.
EP OA dated Oct. 4, 2010 for European Application Serial No. 06827070.1, 4 pages.
EP OA dated Feb. 19, 2009 for EP Application Serial No. 06836638.4-24112 11 pages.
EP OA dated Feb. 20, 2009 for EP Application Serial No. 06 827 070.1-2412, 5 pages.
EP OA dated Mar. 17, 2009 for European Application No. 06 826 886.1-2412, 10 pages.
EP OA dated Mar. 17, 2009 for European Application No. 06 827 080.0-2412, 6 pages.
European OA dated Oct. 5, 2010 for European Application Serial No. 06836689.7-2412, 4 pages.
European OA dated Feb. 19, 2009 for European Application Serial No. 06 836 689.7-2412, 6 pages.
European OA dated Feb. 20, 2009 for European Application Serial No. 06 826 915.8-2412, 5 pages.
European OA dated Sep. 9, 2008 for EP Application Serial No. 06 826 733.5-2412, 2 pages.
European Office Action dated Dec. 14, 2009, for European Patent Application Serial No. 06826816.8, 2 pages.
European Office Action dated Dec. 18, 2009, for European Patent Application Serial No. 06826807.7, 4 pages.
European Office Action dated Jun. 10, 2010 for European Patent Application Serial No. 06827080.0, 5 pages.
European Office Action dated Sep. 17, 2008, for European Patent Application Serial No. 06826807.7, 6 pages.
European Office Action for European Application No. 06827130.3-2412 dated Sep. 24, 2010, 4 pages.
European Patent Office Action dated Apr. 12, 2010 for EP Application Serial No. 06817409.3.
IEEE 802.20 Working Group on Mobile Broadband Wireless Access; QFDD and QTDD: Proposed Draft Air Interface Specification; IEEE 0802.20-05/69, Oct. 28, 2005, retrieved from the internet on Mar. 5, 2007, pp. 6-43-6-44, XP002425098, http://ieee802.org/20/Contributions.html. Last accessed May 24, 2008, 624 pages.
IEEE: "Draft IEEE Standard for Local and metropolitan area networks, Part 16: Air Interface for Fixed Broadband WirelessAccess-Systems,chapters:6.3.2.3,6.3.15-6.3.17,8.2.1.4-8.2.1.11,8.3.5-8.4. 5,8.4.11,11". IEEEP802.16-REVDID5, May 2004, XP002423445.
Jim Tomcik, "0802.20-05/69: QFDD and QTDD: Proposed Draft Air Interface Specification". Contributions to IEEE 802.20 Session 17: Nov. 14-17, 2005. XP002423945. http://ieee802.org/20/Contributions.html, Last accessed on Mar. 9, 2007.
Jim Tomcik, "0802.20-05/69: QFDD and QTDD: Proposed Draft Air Interface Specification" IEEE 802.20 Contribution to Session #17 (14.1 1-17.11.2005) Oct. 28, 2005, pp. 1-5/43, XP002428557.
Jim Tomcik, "C802.20-05/69:QFDD and QTDD: Proposed Draft Air Interface Specification". Contributions to IEEE 802.20 session 17 dated Oct. 28, 2005, pages 1, 6/13-6/32, XP002423050.
Jim Tomcik, et al., MBFDD and MBTDD: Proposed Draft Air Interface Specification. IEEE 802.20 Working Group on Mobile Broadband Wireless Access, XP002426594. http://www.ieee802.org/20/Contribs/C802.20-06-04.pdf. Last accessed on Apr. 26, 2010.
Jim Tomcik, "QFDD and QTDD: Proposed Draft Air Interface Specification" 2005-10-28 "IEEE 802.20 Working Group on Mobile Broadband Wireless Access" Pages 6-20-6-23 XP002423332.
Korean OA dated Jan. 26, 2010 for KR Application Serial No. 2008-7012552, 2 pages.
Korean OA dated Dec. 9, 2009 for Korean Application Serial No. 2008-7012459, 3 pages.
Korean OA dated May 26, 2010 for Korean Application Serial No. 2008-7012459, 3 pages.
Korean Office Action dated Feb. 26, 2010 for Korean Application No. 2008-70127693; 3 pages.
Korean Office Action dated Apr. 28, 2010 for Korean Patent Application Serial No. 2008-7012762, 4 pages.
Korean Office Action dated Aug. 27, 2010 for Korean Patent Application Serial No. 2008-7012463, 3 pages.
Korean Office Action dated Aug. 27, 2010, for Korean Patent Application Serial No. 2008-7012474, 3 pages.
Korean Office Action dated Aug. 31, 2010 for Korean Patent Application Serial No. 2008-7012754, 3 pages.
Korean Office Action dated Dec. 24, 2009, for Korean Patent Application Serial No. 2008-7012465, 2 pages.
Korean Office Action dated Dec. 9, 2009 for Korean Patent Application Serial No. 2008-7012471, 3 pages.

(56) References Cited

OTHER PUBLICATIONS

Korean Office Action dated Feb. 25, 2010 for Korean Patent Application Serial No. 2008-7012476, 4 pages.
Korean Office Action dated Feb. 25, 2010 for Korean Patent Application Serial No. 2008-7012754, 4 pages.
Korean Office Action dated Feb. 26, 2010, for KR Patent Application Serial No. 2008-7012554, 3 pages.
Korean Office Action dated Jan. 28, 2010 for Korean Patent Application Serial No. 2008-7012463, 4 pages.
Korean Office Action dated Jan. 28, 2010, for Korean Patent Application Serial No. 2008-7012474, 4 pages.
Korean Office Action dated Jan. 29, 2010, for Korean Patent Application Serial No. 2008-7012558, 3 pages.
Korean Office Action dated Jun. 28, 2010 for Korean Patent Application Serial No. 2008-7012471, 3 pages.
Korean Office Action dated Mar. 30, 2010 for Korean Application No. 2008-7012586; 3 pages.
Korean Office Action for Korean Application No. 2008-7012687 dated Mar. 31, 2010, 4 pages.
Korean Office Action for Korean Application No. 2008-7012687 dated Sep. 30, 2010, 4 pages.
Korean Office Action for KR Application Serial No. 2008-7012764 dated Mar. 19, 2010, 4 pages.
Korean Office Action for KR Application Serial No. 2008-7012764 dated Aug. 27, 2010, 3 pages.
Korean Office Action from Korean Patent Application No. 2008-7012724 dated Apr. 27, 2010, pp. 3.
KR OA dated Aug. 25, 2010 for Korean Application Serial No. 2008-7012480, 2 pages.
KR OA dated Jan. 29, 2010 for KR Application Serial No. 2008-7012603, 5 pages.
KR OA dated Jun. 28, 2010 for KR Application Serial No. 2008-7012603, 5 pages.
Liu Dawei, et al. "A New Access Method Used in Beyond 3G Mobile System Using MC-CDMA" in International Conference on Communications, Circuits and Systems and West Sino Expositions, IEEE, 2002. Jun. 29-Jul. 1, 2002, Piscataway, NJ, USA. vol. 1, pp. 170-171, XP010632240, ISBN: 0-7803-7547-5.http://ieeexplore.ieee.org/ie15/8402/26511/01180596.pdf?tp=&arnumber=1180596&isnumber=26511. Last accessed May 23, 2008, 2 pages.
Lucent Technologies: "MIMO system integration and signalling in HSDPA" 3GPP TSG RAN WG1, R1-01-0305, [Online] Feb. 27, 2001, XP002428085 Las Vegas, USA Retrieved from the Internet: URL:www.3gpp.org.
OA dated Feb. 20, 2009 for European Application Serial No. 06 836 598.0-2414, 10 pages.
OA dated Jul. 1, 2009 for Korean Application Serial No. 2008-7012465, 9 pages.
Office Action for Chinese Application Serial No. 200680049342.6 dated Jun. 11, 2010, 5 pages.
Office Action for Korean Application Serial No. 2008-7012756 dated Jul. 29, 2010, 2 pages.
Office Action for Korean Patent Application No. 2008-7012556 dated Apr. 30 ,2010, 2 pages.
Office Action for Korean Patent Application Serial No. 2008-7012768 dated Apr. 28, 2010. 4 pages.
Office Action mailed Jan. 25, 2010 for Korean Patent Application No. 2008-7012767 3 pages.
Office Action mailed Jan. 26, 2010 for Korean Patent Application No. 2008-7012467, 5 pages.
Office Action mailed Jan. 26, 2010 for Korean Patent Application No. 2008-7012579, 4 pages.
Office Action mailed Jan. 29, 2010 for Korean Patent Application Serial No. 2008-7012464, 5 pages.
Office Action mailed Oct. 30, 2009 for Korean Patent Application No. 2008-7012766, 3 pages.
Office Action mailed Nov. 16, 2009 for Korean Patent Application No. 2008-7012767 3 pages.
Office Action mailed Dec. 18, 2009 for European Patent Application Serial No. 06836601.2, 3 pages.
Office Action mailed Feb. 23, 2010 for Korean Patent Application No. 2008-7012570, 4 pages.
Office Action mailed Feb. 26, 2010 for Korean Patent Application No. 2008-7012460, 4 pages.
Office Action mailed Feb. 26, 2010 for Korean Patent Application No. 2008-7012461, 3 pages.
Office Action mailed Feb. 26, 2010 for Korean Patent Application No. 2008-7012480, 3 pages.
Office Action mailed Mar. 26, 2010 for Korean Patent Application No. 2008-7012468, 3 pages.
Office Action mailed Mar. 23, 2010 for Korean Patent Application No. 2008-7012481, 3 pages.
Office Action mailed Apr. 23, 2010 for Korean Patent Application No. 2008-7012767 2 pages.
Office Action mailed Jun. 29, 2010 for Korean Patent Application No. 2008-7012461, 3 pages.
Office Action mailed Aug. 13, 2009 for Korean Patent Application Serial No. 2008-7012757, 3 pages.
Office Action mailed Aug. 27, 2008 for European Patent Application Serial No. 06836601.2, 7 pages.
Office Action mailed Sep. 30, 2010 for Korean Patent Application No. 2008-7012481, 4 pages.
Qualcom Inc, IEEE 802.20 Working Group on Mobile Broadband Wireless Access. QFDD and QTDD: Proposed Draf Air Interface Specification. IEEE C802.20-05/69 dated Oct. 28, 2005, pp. 6-36-6-38, XP002424184. http://www.ieee802.org/20/Contribs. Last accessed Mar. 5, 2005.
Qualcom Inc: "IEEE 802.20 Working Group on Mobile Broadband Wireless Access; QFDD and QTDD: Proposed Draft Air Interface Specification; IEEE 0802.20-05/69" dated Oct. 28. 2005, pp. 6-113-6-118, XP002423052. http://www.ieee802.org/20/Contribs.
Qualcomm, Incorporated: "IEEE 802.20 Working Group on Mobile Broadband Wireless Access; QFDD and QTDD: Proposed Draft Air Interface Specification; IEEE C802.20-05/69" [Online] Oct. 28, 2005, p. 6-55, XP002424919 Retrieved from the Internet: URL: http://www.ieee802.org/20/Contribs/>.
Qualcomm Inc. "IEEE 802.20 Working Group on Mobile Broadband Wireless Access; QFDD and QTDD: proposed Drafl Air Interface Specification" dated Oct. 28, 2005, pp. 6-13-6-33, XP002423356.
Qualcomm, Incorporated: "IEEE 802.20 Working Group on Mobile Broadband Wireless Access; QFDD and QTDD: Proposed Draft Air Interface Specification; IEEE C802.20-05/69" [0n1 i ne] 28 Oct. 2005, pp. 6-1-6-12, XP002423187.
Qualcomm: "UHDR-One Connection Layer: Registration, Paging and Disc. Features" 3GPP2, [Online] Aug. 25, 2006, pp. 1-17, XP002429007.
Qualcomm, Incorporated: "IEEE 802.20 Working Group on Mobile Broadband Wireless Access; QFDD and QTDD: Proposed Draft Air Interface Specification; IEEE C802.20-05/69" [Online] Oct. 28, 2005, pp. 6-56-6-57, XP002424920 Retrieved from the Internet: URL: http://www.ieee802.org/20/Contribs/>.
Rosenberg, J. et al.: "SIP: Session Initiation Protocol; RFC 3261" Request for Comments: 3261, Jun. 2002, p. 1, 176,177,184-193, XP002423186.
Sandip Sarkar: "Qualcomm Proposal for 3GPP2 Physical Layer; Version 1.0; pp. 1- 10, 72-74; C30-20060522-035 QC-Proposal-v1. 0" Qualcomm; 3GPP2, [Online] May 22, 2006, XP002426839.
Telecommunication Industry Association: Upper Layer (Layer 3) Signalling Standard for CDMA2000 Spread Spectrum Systems, Release C. TINEINIS-2000.5-C, May 2002, XP002423757.
Telecommunications Industry Association: Upper Layer (Layer 3) Signalling Standard for CDMA2000 Spread Spectrum Systems, Release C, chapters: 2.6.4.3,2.6.6.2.8,2.73..26..63,. Tineininterim Standard,IS-2000, 5-C, No. Tineinis-2000. 5-C, May 2002, XP002423446.
Tim Tomcik, et al. MBFDD and MBTDD: Proposed Draft Air Interface Specification. Chapter 6: Lower MAC Control Sublayer. IEEE 802.20 Working Access. XP002423758. w.ieee802.org/20/Contribs/C802.20-06-04.pdf. Last accessed Feb. 28, 2007.
Tomcik, et al., "QFDD and QTDD: Proposed Drafl Air Interface Specification, chapter 6, Lower MAC Control Sublayer". IEEE C802.20-25/69, XX, XX dated Oct. 28, 2005, pp. I-XXXI, 1, XP002423447.

(56) References Cited

OTHER PUBLICATIONS

Tomcik J: "QFDD and QTDD: Technology Overview; chapter 25.2.1 Tune Away Mechanism; IEEE C802.20-05/68; pp. 1-10, 105, 106" IEEE 802.20 Working Group on Mobile Broadband Wireless Access, [Online] Oct. 28, 2005, XP002426838 Retrieved from the Internet: URL: http://grouper.ieee.org/groups/802/20/ Contributions.html>.
Tomcik Jim, "C802.20-05/69: QFDD and QTDD: Proposed Draft Air Interface Specification". IEEE 802.20 contribution to session # 17 dated Oct. 28, 2005, XP002422176. http://ieee802.org/20/contributions.html. Last accessed Feb. 27, 2007.
Tomcik Jim: "MBFDD and MBTDD Wideband Mode: Technology Overview" Internet Citation, [online] Oct. 28, 2005, XP002422172 Retrieved from the Internet: URL: http://www.ieee802.org/20/contributions.html >.
Turner, S. et al., "cdma 2000 Hybrid Access Terminal Operation", Announcement Qualcomm CDMA Technologies, San Diego, CA, USA, Apr. 9, 2001, pp. 1-25, XP002422171.
Wonil Roh et. al.: "An Efficient CQICH Signaling for MIMO OFDMA" IEEE 802.16 Broadband Wireless Access Working Group, [Online] Aug. 31, 2004, XP002428096 Retrieved from the Internet: URL: www.ieee802.org/16/>.
Chinese Office Action for CN Application No. 200680049744.6 dated Sep. 9, 2009, 4 pages, Sep. 2010.
EP OA dated Oct. 4, 2010 for EP Application Serial No. 06836638.4, 4 pages.
European Office Action dated Sep. 24, 2010, for European Patent Application Serial No. 06826919.0, 4 pages.
European Office Action dated Sep. 24, 2010, for European Patent Application Serial No. 06836656.6, 4 pages.
European Office Action dated Oct. 4, 2010, for European Patent Application Serial No. 06826853.1, 7 pages.
European Office Action dated Sep. 24, 2010, for EP Patent Application Serial No. 06826849.9, 4 pages.
European Office Action mailed Sep. 24, 2010 for European Patent Application No. 06844225.0, 4 pages.
European Search Report mailed Nov. 29, 2010 for European Application No. 10152463.5-2413, 6 pages.
International Search Report and Written Opinion dated Apr. 13, 2007, for PCT Application Serial No. PCT/US2006/042013, 17 pages.
Japanese OA dated Dec. 7, 2010 for Japanese Application Serial No. 2008-538097, 3 pages.
Korean Office Action dated Aug. 31, 2010, for KR Patent Application Serial No. 2008-7012554, 3 pages.
Korean Office Action dated Sep. 30, 2010 for Korean Application Serial No. 2010-7017046, 4 pages.
Notice of Grounds for Rejection for Korean Application No. 2008-7012768, dated Oct. 29, 2010 (English Translation).
Office Action mailed Sep. 27, 2010 for Chinese Patent Application No. 200680049453.7, 13 pages.
3GPP2. Medium Access Control (MAC) Standard for cdma2000 Spread Spectrum Systems, 3GPP2 C.S0003-D Version 1.0, Feb. 2004, published online at [http://www.3gpp2.org/Public_html/specs/C.S0003-D.v1.0_MAC_031504.pdf] 8 pages.
802.20 Evaluation Criteria—Ver. 1.0, IEEE 802 LANIMAN Standards Committee, Sep. 23, 2005, pp. 18-35, URL: [http://www.ieee802.org/20/P_Docs/IEEE_802.20-Pd-09.doc].
cdma2000 High Rate Packet Data Air Interface Specification, 3GPP2 C.S0024-A Version 2.0, Jul. 2005, p. 8-97-8-114, URL, http: //www.3gpp2.org/Public_html/specs/C.S0024-Av2.0_050727.pdf.
Chinese OA dated Nov. 30, 2010 for CN Applcation Serial No. 200680049404.3, 8 pages.
Chinese OA dated Jan. 19, 2011 for Chinese Application Serial No. 200680049699.4, 11 pages.
Chinese OA for CN Application No. 200680049464.5, mailed Jan. 10, 2011, 5 pages.
Chinese Office Action dated Nov. 12, 2010 for Chinese Patent Application Serial No. 200680049463.0, 7 pages.
Chinese Office Action dated Nov. 9, 2010, mailed Jan. 12, 2011, for Chinese Patent Application Serial No. 200680049589.8, 8 pages.
Chinese Office Action dated Dec. 31, 2010, for Chinese Patent Application Serial No. 200680049364.2, 5 pages.
Chinese Office Action dated Dec. 24, 2010 for Chinese Patent Application No. 200680049284.7, 5 pages.
Chinese Office Action dated Dec. 27, 2010 for Chinese Patent Application Serial No. 200680049300.2, 2 pages.
Chinese Office Action dated Dec. 31, 2010 for Chinese Patent Application Serial No. 200680049680.X, 9 pages.
Chinese Office Action dated Feb. 18, 2011, for Chinese Patent Application Serial No. 200680049274.3, 6 pages.
Chinese Office Action dated Jan. 20, 2011 for Chinese Patent Application No. 200680049251.2.
Chinese Office Action dated Jan. 26, 2011 for Chinese Patent Application Serial No. 200680049492.7, 5 pages.
Chinese Office Action dated Jan. 6, 2011 for Chinese Application Serial No. 200680049670.6, 4 pages.
Chinese Office Action dated Oct. 13, 2010, mailed Dec. 7, 2010, for Chinese Patent Application Serial No. 200680049771.3, 11 pages.
Chinese Office Action for Chinese Application No. 200680049812.9 dated Jan. 25, 2011, 11 pages.
Chinese Office Action for CN Application Serial No. 200680049677.8 dated Jan. 26, 2011, 7 pages.
CN OA dated Dec. 31,2010 for CN Application Serial No. 200680049332.2, 27 pages.
CN OA for Chinese Application No. 200680049630.1 dated Dec. 31, 2010, 7 pages.
CN Office Action mailed Jan. 6, 2011 for Chinese Patent Application No. 200680049640.5, 5 pages.
EP OA for EP Application No. 06826942.2 dated Jan. 25, 2011, 3 pages.
ETS 300744, Digital Video Broadcasting; Framing Structure, Channel Coding, and Modulation for digital Terrestrial Television, European Telecommunication Standards Institute (ETSI), Nov. 1996.
European Office Action dated Dec. 19, 2008 for European Application No. 06 817409.3.
Harada et al. "Investigations on BLER requirements of associated control channels for IP packet transmission in forward link for VSF-OFCDM broadband packet wireless access", Vehicular Technology Conference, 2004. VTC2004-Fall. 2004 IEEE 60th, Sep. 2004.
Japanese OA dated Dec. 21, 2010 for JP Application Serial No. 2008538094, 6 pages.
Japanese Office Action dated Dec. 7, 2010 for Japanese Patent Application Serial No. 2008-538002, 3 pages.
Japanese Office Action dated Feb. 15, 2011 for Japanese Patent Application No. 2008-537969.
Japanese Office Action dated Feb. 8, 2011, for Japanese Patent Application Serial No. 2008-537988, 5 pages.
Japanese Office Action dated Jan. 18, 2011 for JP Application No. 2008-537970; 5 pages.
Japanese Office Action dated Jan. 25,2011 for Japanese Patent Application No. 2008537979, 5 pages.
Japanese Office Action dated Jan. 26, 2011, mailed Feb. 1, 2011, for Japanese Patent Application Serial No. 2008-537997, 2 pages.
Japanese Office Action dated Jan. 4, 2011 for Japanese Patent Application Serial No. 2008-537944, 4 pages.
Japanese Office Action for Japanese Application No. 2008-538096 dated Feb. 8, 2011, 6 pages.
Japanese Office Action mailed Dec. 7, 2010 for Japanese Patent Application Serial No. 2008-537990, 3 pages.
Japanese Office Action mailed Dec. 21, 2010, for Japanese Patent Application Serial No. 2008-537985, 3 pages.
JP Office Action for JP application No. 2008-537956 mailed Dec. 7, 2010, 3 pages.
JP Office Action mailed Jan. 11, 2011 for Japanese Patent Application No. 2008-538069, 3 pages.
Korean Office Action dated Dec. 29, 2010 for Korean Patent Application Serial No. 2008-7012471, 3 pages.
Office Action dated Jan. 25, 2011 for European Patent Application No. 06826876.2, 3 pages.
Office Action dated Oct. 9, 2010 for Chinese Patent Application No. 200680049399.6, 11 pages.
Office Action dated Mar. 1, 2011 for Japanese Patent Application No. 2008-537995, 4 pages.

(56) References Cited

OTHER PUBLICATIONS

Office Action for Chinese Application No. 200680049394.3 dated Jan. 10, 2011, 8 pages.
Office Action for Chinese Patent Application No. 200680049746.5 dated Jan. 26, 2011.
Office Action for Korean Application No. 2008-7012761 dated Jan. 25, 2011, 4 pages.
Office Action for Korean Application No. 2008-7012761 dated May 19, 2010, 4 pages.
Office Action mailed Jan. 25, 2011 for Japanese Patent Application No. 2008-538077, 3 pages.
Office Action mailed Dec. 14, 2010 for Chinese Patent Application No. 200680049322.9, 5 pages.
QUALCOMM Europe, Description and link simulations of MIMO schemes for OFDMA based E-UTRA downlink evaluation, 3GPP TSG-RAN WGI #42 R1-050903, Sep. 2, 2005, URL: http://www.3gpp.orgfftp/tsg_ran/WGI_RLUTSGRI-42/Docs/R1-050903.zip.
Taiwan Search Report—TW095121792—TIPO—Jan. 21, 2011.
Telecommunications Industry Association. "Upper Layer (Layer3) Signaling Standard for cdma2000 Spread Spectrum Systems," TIA/EIA/IS-2000.5-A-1, Nov. 2000, published online at [http://www.tiaonline.org/standards/technology/cdma2000/documents/TIA-EIA-IS-2000-5-A-1.pdf] 11 pages.
TIA-EIA-IS-856, TIA/EIA Interim Standard, "cdma2000 High Rate Packet Data Air Interface Specification," Telecommunications Industry Association, Nov. 2000.
Translation of Chinese Office Action for Chinese Application Serial No. 200680049342.6 dated Jan. 12, 2011, 6 pages.
Translation of Japanese Office Action for Japanese Application Serial No. 2008-538024 dated Feb. 1, 2011.
Translation of Japanese Office Action for JP Application No. 2008-538003, dated Dec. 7, 2010.
Translation of Office Action for Chinese Patent Application No. 200680049832.6 dated Jan. 12, 2011.
Translation of Office Action for Japanese Patent Application No. 2008-538081 dated Feb. 8, 2011.
Translation of Office Action in Chinese application 200680049482.3 corresponding to U.S. Appl. No. 12/091,447, citing CN1496636 dated Mar. 17, 2011.
Translation of Office Action in Japan application 2008-517175 corresponding to U.S. Appl. No. 11/454,474, citing JP2004159235, JP0722998 and WO2004107796 dated Feb. 1, 2011.
Translation of Office Action in Japan application 2008-537976 corresponding to U.S. Appl. No. 12/091,461, citing 3GPP2_C_S0024P8_154_8_165_10_45_year_2005, 3GPP2_C_50024_P8_151_8_170_year_2005, JP2005508588, JP2004153619, JP2004530347, JP2001274767, JP2004088180 and JP2005514865 dated Mar. 3, 2010.
Translation of Office Action in Japan application 2008-538031 corresponding to U.S. Appl. No. 12/091,576, citing JP2002026795, JP2003517741, JP2003110582 and WO0247321 dated Feb. 22, 2011.
Translation of Office Action in Japan application 2008-538107 corresponding to U.S. Appl. No. 12/091,475, citing WO2005074184 and JP2005101990 dated Feb. 24, 2011.
Translation of Office Action in Japanese application 2008-537974 corresponding to U.S. Appl. No. 12/091,480, citing EP1487230, JP2005286998, JP2001512638, JP2005502218 and WO0249305 dated Feb. 24, 2011.
Translation of Office Action in Japanese application 2008-538098 corresponding to U.S. Appl. No. 12/091,455, citing 3GPP2_C_S0024_A_XP002430079_pp._8_155_8_169_year_2005, JP11313370, JP2002010341 and JP2002305534 dated Mar. 3, 2011.
3GPP2 C: "cdma2000 High Rate Packet Data Air Interface Specification; 3GPP2 C S0024-A version 2.0," 3GPP2 CDMA2000, Jul. 2005, 43 pages, XP002422601.
3GPP2 C: "cdma2000 High Rate Packet Data Air Interface Specification", 3GPP2 C. S0024-A version 2.0, 3GPP2 CDMA2000, May 2006, 1621 pages.
3GPP2 C.S0024-A V2.0, Jul. 2005, p. 8-11-8-12, 8-29-8-31, (for information: p. 8-86-8-87, 8-101).
3GPP2 C.S0024-A V2.0, Jul. 2005, pp. 8-10 to 8-12, 8-29 to 8-32, 8-86 to 8-87, 8- 106, and 8-168.
3GPP2: "cdma2000 High Rate Packet Data Air Interface Specification", 3GPP2 C.S0024-A, Jul. 2005, Version 2.0, p. 8-151,8-157-8-169, section 8.9.1 and 8.9.6.2.1, URL: http://www.3gpp2.org/Public_html/specs/C.S0024-A_v2.0_050727.pdf.
Chinese OA dated Jul. 29, 2011 for Chinese Application Serial No. 200680049699.4, 12 pages.
Chinese Office Action dated Apr. 27, 2011 for Chinese Patent Application Serial No. 200680049463.0, 7 pages.
Chinese Office Action dated May 31, 2011 for Chinese Patent Application No. 200680049838.3, 4 pages.
Chinese Office Action dated Aug. 8, 2011, for Chinese Patent Application Serial No. 200680049364.2, 5 pages.
Chinese Office Action dated Sep. 6, 2011, for Chinese Patent Application Serial No. 200680049464.5, 7 pages.
Chinese Office Action dated Apr. 20, 2011 for CN Application No. 200680049600.0; 11 pages.
Chinese Office Action dated Apr. 26, 2011, for Chinese Patent Application Serial No. 200680049310.6, 6 pages.
Chinese Office Action dated Aug. 18, 2011 for CN Patent Application Serial No. 200680049802.5, 7 pages.
Chinese Office Action dated Aug. 23, 2011 for Chinese Patent Application No. 200680049251.2, 6 pages.
Chinese Office Action dated Aug. 3, 2011 for Chinese Patent Application Serial No. 200680049492.7, 7 pages.
Chinese Office Action dated Aug. 31, 2011, for Chinese Patent Application Serial No. 200680049274.3, 7 pages.
Chinese Office Action dated Feb. 18, 2011 for CN Patent Application Serial No. 200680049802.5, 7 pages.
Chinese Office Action dated Jan. 11, 2011, for Chinese Patent Application Serial No. 200680049428.9, 4 pages.
Chinese Office Action dated Jul. 14, 2010, mailed Sep. 27, 2010 for Chinese Patent Application Serial No. 200680049428.9, 4 pages.
Chinese Office Action dated Jun. 27, 2011 for Chinese Patent Application Serial No. 200680049300.2, 4 pages.
Chinese Office Action dated Jun. 29, 2011 for CN Application Serial No. 200680049453.7, 4 pages.
Chinese Office Action dated Mar. 2, 2011 for CN Application Serial No. 200680049453.7, 4 pages.
Chinese Office Action dated May 11, 2011, for Chinese Patent Application Serial No. 200680049428.9, 6 pages.
Chinese Office Action for Chinese Application Serial No. 200680049342.6 dated Apr. 27, 2011, 6 pages.
Chinese Office Action for CN Application Serial No. 200680049677.8 dated Jul. 13, 2011, 9 pages.
Chinese office Action mailed Jun. 22, 2011, for Chinese Patent Application Serial No. 200680049400.5, 4 pages.
Chinese Office Action translation for Chinese Patent Application No. 200680049836.4, dated May 17, 2011, 9 pages.
CN OA dated Jul. 22, 2011 for CN Application Serial No. 200680049332.2, 13 pages.
CN OA for Chinese Application No. 200680049630.1 dated Aug. 5, 2011, 4 pages.
Cn Office Action dated Aug. 3, 2011 for CN Patent Application Serial No. 200680049352.X, 10 pages.
CN Office Action for Chinese Application No. 200680049752.0 mailed Mar. 23, 2011, pp. 4.
CN Office Action mailed Feb. 24, 2011 for Chinese Patent Application Serial No. 200680049352.X, 9 pages.
CN Office Action with English translation for CN application No. 200680049443.3 mailed Jan. 26, 2011, pp. 6.
CN Office Action with English translation for CN application No. 200680049740.8 mailed Mar. 16, 2011, pp. 5.
English Translation of Japanese Office Action for Japanese Patent Application No. 2008-537984, dated Sep. 13, 2011 7 pages.
English Translation of Japanese Office Action mailed Feb. 22, 2011 for Japanese Patent Application No. 2008-537965.
EP OA for EP Application No. 06826942.2 dated Jun. 14, 2011, 5 pages.

(56) References Cited

OTHER PUBLICATIONS

European Office Action dated Aug. 11, 2011 for European Patent Application Serial No. 06826727.7, 6 pages.
European Office Action dated Aug. 11,2011 for EP Application No. 06817411.9; 7 pages.
European Office Action dated Feb. 8, 2011 for EP Application Serial No. 06827064.4, 14 pages.
European Office Action dated Sep. 24, 2010 for European Patent Application Serial No. 06826918.2, 4 pages.
European Office Action for European Patent Application No. 06 817 413, May 2412, dated Aug. 11, 2011, 7 pages.
European Office Action from European Application No. 06 827 128. 7-2412 dated Aug. 11, 2011.
Japanese OA dated Feb. 22, 2011 for JP Application Serial No. 2008-537946, 4 pages.
Japanese OA dated May 20, 2011 for JP Application Serial No. 2008-538094, 3 pages.
Japanese OA mailed May 31, 2011 for Japanese Application Serial No. 2008-538097, 2 pages.
Japanese Office Action dated Mar. 1, 2011, for Japanese Patent Application Serial No. 2008-538025, 4 pages.
Japanese Office Action dated Aug. 23, 2011, for Japanese Patent Application Serial No. 2008-538025, 3 pages.
Japanese Office Action dated Aug. 30, 2011 for Japanese Patent Application Serial No. 2008-538023, 3 pages.
Japanese Office Action dated Aug. 16, 2011 for Japanese Patent Application No. 2008-537969, 1 page.
Japanese Office Action dated Feb. 8, 2011 for Japanese Patent Application Serial No. 2008538082, 3 pages.
Japanese Office Action dated Jul. 26, 2011 for Japanese Application Serial No. 2008-538106, 4 pages.
Japanese Office Action dated Jun. 21, 2011 for JP Application No. 2008-537970; 3 pages.
Japanese Office Action dated Mar. 1, 2011, for Japanese Patent Application Serial No. 2008-537964, 6 pages.
Japanese Office Action dated Mar. 1, 2011 for Japanese Patent Application Serial No. 2008-538023, 3 pages.
Japanese Office Action dated Mar. 15, 2011 for Japanese Application Serial No. 2008-538106, 5 pages.
Japanese Office Action dated Mar. 15, 2011 for JP Patent Application Serial No. 2008-538022, 5 pages.
Japanese Office Action dated Sep. 6, 2011 for Japanese Patent Application Serial No. 2008538082, 7 pages.
Japanese Office Action for Japanese Application Serial No. 2008-537996 dated Mar. 29, 2011, 6 pages.
Japanese Office Action from JP Patent Application No. 2008-538084, dated Aug. 23, 2011, 2 pages.
Japanese Office Action mailed Mar. 1, 2011, for JP Patent Application Serial No. 2008-538079, 6 pages.
Jim Tomcik, "080220-05169: QFDD and QTDD: Proposed Draft Air Interface Specification" IEEE: Contributions to IEEE 80220 session 17: Nov. 14-17, 2005 dated Oct. 28, 2005 XP002422600 http://ieee802org/20/Contributions.html Last accessed Mar. 1, 2007.
JP OA dated Mar. 1, 2011 for JP Application Serial No. 2008-538068, 4 pages.
JP OA for Japanese Application No. 2008-538033 dated Feb. 22, 2011, 2 pages.
JP OA mailed Aug. 23, 2011, for JP Application Serial No. 2008538068, 6 pages.
JP Office Action dated Aug. 2, 2011, for Japanese Patent Application No. 2008-538069, 2 pages.
JP Office Action for Japanese Application No. 2008-537980 dated Mar. 29, 2011, 4 pages.
JP Office Action from Japanese Patent Application No. 2008-538084 dated Mar. 29, 2011, pp. 6.
JP Office Action mailed Feb. 22, 2011 for Japanese Patent Application Serial No. 2008-537994, 5 pages.
JP Office Action with English translation for JP Application No. 2008-538014 mailed Mar. 15, 2011, pp. 11.
Korean Office Action dated Feb. 17, 2011 for Korean Patent Application Serial No. 2010-7029654, 3 pages.
Korean Office Action dated Jul. 29, 2011 for Korean Patent Application Serial No. 2010-7024469, 3 pages.
Office Action dated Mar. 29, 2011 for Japanese Patent Application No. 2008-537978, 9 pages.
Office Action mailed Jan. 29, 2010 for Korean Patent Application No. 2008-7012765, 3 pages.
Office Action mailed Mar. 9, 2010 for U.S. Appl. No. 12/091,482, 29 pages.
Office Action mailed May 6, 2011 for Chinese Patent Application No. 200680049640.5, 5 pages.
Office Action mailed Sep. 13, 2010 for U.S. Appl. No. 12/091,482, 20 pages.
Preliminary Notice of Reasons for Rejection for Japanese Application No. 2008-537984, dated Mar. 15, 2011 (English Translation).
Qualcomm Europe, "Qualitative Evaluation of MIMO schemes for OFDM, -based E-Utra downlink," 3GPP TSG-RAN WG1 #42bis, R1-051267, Oct. 14, 2005, URL: http:/www.3gpp.org/ftp/tsg_ran/WG1_RL1/TSGR1_42bis/Docs/R1-051267.zip, 5 pages.
Soong, A. et al., "Forward High-Speed Wireless Packet Data Service in IS-2000—1xEV-DV," IEEE Communications Magazine, 41 (8), pp. 170-177, Aug. 2003.
Translation of Office Action for Chinese Patent Application No. 200680049832.6 dated Jul. 19, 2011, 4 pages.
Translation of Office Action for Japanese Patent Application No. 2008-538080 dated Mar. 29, 2011.
3GPP2: "cdma 2000 High Rate Packet Data Air Interface Specification", 3rd Generation Partnership Project 2,3GPP2 C.S0024-A Version 2.0, pp. 8-25-8.28. Jul. 2005.
3GPP2: "cdma 2000 High Rate Packet Data Air Interface Specification", 3GPP2 C.S0024-A, Jul. 2005, Version 2.0, p. 8-26, 8-38.
3GPP2: "cdma 2000 High Rate Packet Data Air Interface Specification", 3GPP2 C.S0024-A, Sep. 2000, Version 2.0, p. 6-7-6-8.
3GPP2: "cdma2000 High Rate Packet Date Air Interface Specification", Version 2.0, 3GPP2 C.S0024-A, 8-68-8-69, Jul. 2005.
3GPP2 C.S0024-A, "cdma 2000 High Rate Packet Data Air Interface Specification", Version 2.0, 7-18, 8-29, 8-36, 8-38-8-39, 8-41,8-155-8-156, 10-1, Jul. 2005.
3GPP2 C.S0024-A, "CDMA 2000 High Rate Packet Data Air Interface Specification", Version 2.0, 8-15, 8-43, Jul. 2005.
3GPP2 C.S0024-A, "CDMA 2000 High Rate Packet Data Air Interface Specification", Version 2.0, 8-151-8-155, Jul. 2005.
3GPP2 C.S0038-A: "Signaling Conformance Specification for High Rate Packet Data Air Interface"; Sep. 26, 2005.
Office Action for Chinese Patent Application No. 200680049746.5 dated Sep. 15, 2011, 5 pages.
IEEE Standard 802.16, IEEE Standard for Local and Metropolitan Area Networks, Part 16: Air Interface for Fixed Broadband Wireless Access Systems, pp. 1-895, Oct. 1, 2004.

\* cited by examiner

QUICK PAGING CHANNEL WITH REDUCED PROBABILITY OF MISSED PAGE

CLAIM OF PRIORITY UNDER 35 U.S.C. §119

This application claims the benefit of U.S. Provisional Application No. 60/691,901, filed Jun. 16, 2005, entitled "QUICK PAGING CHANNEL WITH REDUCED PROBABILITY OF MISSED PAGES," and Provisional Application Ser. No. 60/731,037, filed Oct. 27, 2005, entitled "METHODS AND APPARATUS FOR PROVIDING MOBILE BROADBAND WIRELESS HIGHER MAC," both are assigned to the assignee hereof and hereby expressly incorporated by reference herein.

BACKGROUND

In a random access wireless communication system, a communication link between an access terminal and an access point is not continuous. An access terminal can register with an access point and can remain in an idles state. The access terminal can transition from the idle state to an active state to initiate an active communication link. In the active state, the access terminal is able to receive information from the access point as well as transmit information to the access point.

For the majority of the time, the access terminal remains in the idle state, awaiting the transition into the active state. The access terminal is typically a mobile device that operates from batteries stored within the device. The access terminals can conserve energy and extend the battery operated run time by transitioning to a low power state, often referred to as a sleep state. However, in many instances, the access terminal cannot immediately transition from the sleep state to the active state.

The access terminal typically does not have the ability to monitor information transmitted by the access points when it is in the sleep state. Therefore, the access terminals typically periodically transition to an idle state to monitor for messages from the access points.

Some wireless communication systems incorporate quick paging channels that are used by the access points to indicate the presence of a paging message to an access terminal. The paging message can direct the particular access terminal to transition to the active state to support active information exchange.

The wireless communication system can assign a particular bit in a particular message as the quick paging bit for a particular access terminal or group of access terminals. The access terminals can then awaken from a sleep state for a duration that is sufficient to receive the quick paging bit. If the access terminal detects an active quick paging bit, the access terminal becomes aware of a subsequent paging message and can remain in or transition to the idle state to monitor for the paging message. Conversely, if the access terminal fails to detect its assigned quick paging bit, it assumes that there are no imminent paging messages directed to it. In this manner, the access terminals can minimize the time that they need to be in an idle mode, thereby maximizing the time that can be dedicated to a lower power sleep state.

For example, both CDMA2000 and WCDMA wireless communication systems have a quick paging channel that allows a mobile station to periodically monitor an assigned quick paging bit to detect a presence of a page. When a page is sent to the mobile station, the base station sets the corresponding bit to 1. If the bit is set, the mobile station, which represents the access terminal, listens to the full page. However, if the access terminal improperly detects the bit to be 0, or determines an erasure indicating the inability to discern the state of the received bit, then a missed page occurs. Therefore, there is a need to reduce the probability of a missed page. However, there remains the need to maintain or increase the battery powered operational time for mobile devices.

BRIEF SUMMARY

A quick paging channel in a random access wireless communication system includes at least one bit in a quick paging frame identifying the presence of a paging message for an access terminal or group of access terminals. The quick paging bits identifying the presence of a paging message for a first access terminal is encoded with one or more quick paging bits corresponding to one or more additional access terminals to produce one or more forward error correction bits. The jointly encoded quick paging bits are broadcast to the access terminals by time division multiplexing the quick paging frame with additional frames of information.

Aspects of the disclosure include a method of notifying an access terminal. The method includes determining presence of a scheduled message for the access terminal, setting a quick paging bit from a plurality of quick paging bits in a quick paging block, the quick paging bit corresponding to the access terminal, encoding the quick paging block to generate an encoded quick paging packet, generating at least one Orthogonal Frequency Division Multiplex (OFDM) symbol having at least a portion of the encoded quick paging block, and transmitting the at least one OFDM symbol.

Aspects of the disclosure include a method of notifying an access terminal. The method includes setting a quick paging bit corresponding to the access terminal in a quick paging block having a plurality of bits corresponding to a plurality of access terminals, compressing the quick paging block to generate a compressed quick paging block, and encoding the compressed quick paging block to generate an encoded quick paging block.

Aspects of the disclosure include a method of processing a quick paging message. The method includes receiving a quick paging packet, decoding the quick paging packet to generate a quick paging block, decompressing the quick paging block, and determining a status of a quick paging bit associated with an access terminal based on an output of the decompressing process.

Aspects of the disclosure include a system for generating a quick paging message that includes a scheduler configured to determine scheduled a paging message for an access terminal, a quick paging block generator coupled to the scheduler and configured to assert a quick paging bit corresponding to the access terminal and configured to generate a quick paging block having at least the quick paging bit and a distinct quick paging bit corresponding to a distinct access terminal, an encoder coupled to the quick paging block generator and configured to generate an encoded quick paging packet based on the quick paging block, and a transmit processor coupled to the encoder and configured to generate at least one Orthogonal Frequency Division Multiplex (OFDM) symbol having at least a portion of the encoded quick paging packet.

Aspects of the disclosure include a system for generating a quick paging message that includes means for determining presence of a scheduled message for the access terminal, means for setting a quick paging bit from a plurality of quick paging bits in a quick paging block, the quick paging bit corresponding to the access terminal, means for encoding the quick paging block to generate an encoded quick paging packet, means for generating at least one Orthogonal Frequency Division Multiplex (OFDM) symbol having at least a portion of the encoded quick paging block, and means for transmitting the at least one OFDM symbol.

Aspects of the disclosure include a system for generating a quick paging message that includes means for setting a quick paging bit corresponding to the access terminal, means for jointly encoding the quick paging bit with at least one additional quick paging bit corresponding to a distinct access terminal to generate an encoded quick paging block, and means for time division multiplexing the encoded quick paging block with distinct information over a channel.

Aspects of the disclosure include a system for generating a quick paging message that includes means for receiving a quick paging packet, means for decoding the quick paging packet to generate a quick paging block, means for decompressing the quick paging block, and means for determining a status of a quick paging bit associated with an access terminal based on an output of the decompressing process.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION

A wireless communication system can decrease the probability of missed pages by providing some form of redundancy associated with the quick paging bit. Rather than merely extending the number of quick paging bits assigned to each access terminal, the wireless communication system can provide redundancy through the joint encoding of a plurality of quick paging bits. In this manner, each access terminal or group of access terminals is assigned a single quick paging bit, but redundancy is provided through joint encoding of a plurality of quick paging bits. The wireless communication system can reduce the probability of a missed paging message by increasing the number of redundant bits, which can be forward error correction bits. There is no theoretical limit to the number of redundant bits that may be added from the joint encoding process. However, from a practical perspective, the number of redundant bits is likely less than the number of bits required to send the actual paging messages.

The wireless communication system can periodically transmit a quick paging block having the jointly encoded quick paging message. The number of quick paging bits set in each quick paging block is likely relatively low, provided the wireless communication system schedules a quick paging block at a sufficiently high rate. The relative sparse population of set quick paging bits in any particular quick paging frame allows the wireless communication system to compress the quick paging block to further reduce the number of bits that are transmitted to the access terminals. The wireless communication system can implement any one of various compression techniques, at least one of which is discussed in further detail below.

The quick paging channel having the jointly encoded quick paging bits can be transmitted to the various access terminals using a dedicated quick paging channel. Alternatively, the quick paging channel can be multiplexed with other channels. For example, the quick paging channel can be time division multiplexed, frequency division multiplexed, code division multiplexed, or otherwise multiplexed with other information.

In an Orthogonal Frequency Division Multiplex (OFDM) wireless communication system, the quick paging block, or compressed quick paging block, can be configured to be broadcast in a predetermined number of OFDM symbols. The wireless communication system can periodically transmit the OFDM symbol having the quick paging information. Thus, the system operates to time division multiplex the quick paging information over the channels used to carry other information.

Figure 1:
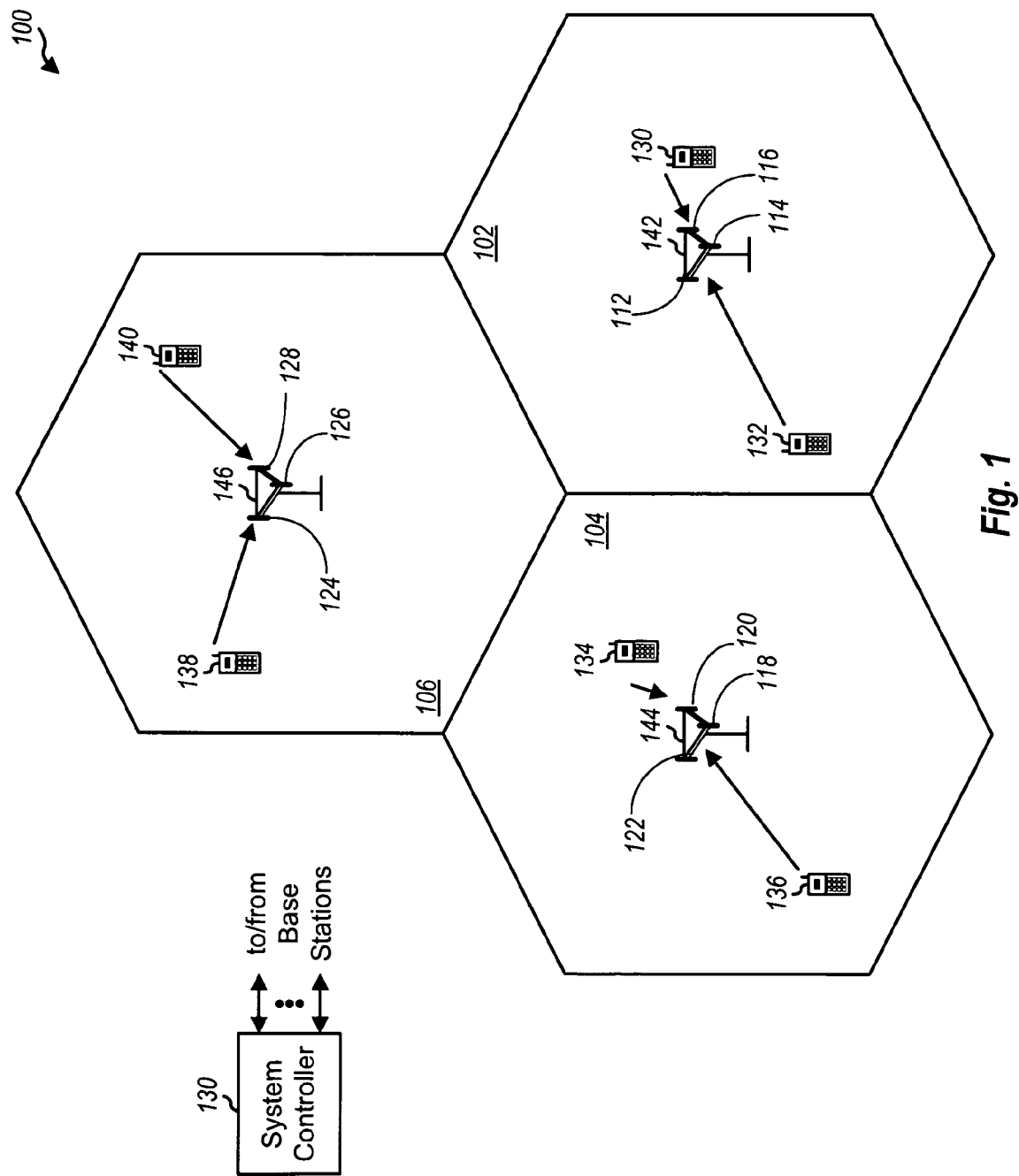
FIG. 1 is a simplified functional block diagram of an embodiment of a multiple access wireless communication system.

FIG. 1 is a simplified functional block diagram of an embodiment of a multiple access wireless communication system 100. A multiple access wireless communication system 100 includes multiple cells, e.g. cells 102, 104, and 106. In the embodiment of FIG. 1, each cell 102, 104, and 106 may include an access point 150 that includes multiple sectors.

The multiple sectors are formed by groups of antennas each responsible for communication with access terminals in a portion of the cell. In cell 102, antenna groups 112, 114, and 116 each correspond to a different sector. For example, cell 102 is divided into three sectors, 120a-102c. A first antenna 112 serves a first sector 102a, a second antenna 114 serves a second sector 102b, and a third antenna 116 serves a third sector 102c. In cell 104, antenna groups 118, 120, and 122 each correspond to a different sector. In cell 106, antenna groups 124, 126, and 128 each correspond to a different sector.

Each cell is configured to support or otherwise serve several access terminals which are in communication with one or more sectors of the corresponding access point. For example, access terminals 130 and 132 are in communication with access point 142, access terminals 134 and 136 are in communication with access point 144, and access terminals 138 and 140 are in communication with access point 146. Although each of the access points 142, 144, and 146 is shown to be in communication with two access terminals, each access point 142, 144, and 146 is not limited to communicating with two access terminals and may support any number of access terminals up to some limit that may be a physical limit, or a limit imposed by a communications standard.

As used herein, an access point may be a fixed station used for communicating with the terminals and may also be referred to as, and include some or all the functionality of, a base station, a Node B, or some other terminology. An access terminal (AT) may also be referred to as, and include some or all the functionality of, a user equipment (UE), a user terminal, a wireless communication device, a terminal, a mobile terminal, a mobile station or some other terminology.

It can be seen from FIG. 1 that each access terminal 130, 132, 134, 136, 138, and 140 is located in a different portion of it respective cell than each other access terminal in the same cell. Further, each access terminal may be a different distance from the corresponding antenna groups with which it is communicating. Both of these factors provide situations, in addition to environmental and other conditions in the cell, to cause different channel conditions to be present between each access terminal and its corresponding antenna group with which it is communicating.

Each access terminal, for example 130, typically experiences unique channel characteristics not experienced by any other access terminal because of the varying channel conditions. Furthermore, the channel characteristics change over time and vary due to changes in location.

An access point, for example 142, may broadcast a frame or block having the quick paging information. Each of the access terminals, 130 and 132 within the coverage area of the access point 142 can receive the quick paging information and process it to determine if a quick paging bit that it is assigned to is active indicating the presence of a paging message directed to the access terminal.

The differing channel conditions experienced by the access terminals 130 and 132 alter their respective abilities to accurately recover the quick paging information. However, because the quick paging information is encoded to provide redundant information, such as one or more forward error correction bits, the access terminals 130 and 132 have a greater probability of successful determination of the assigned quick paging bits, thereby minimizing the probability of a missed page to that access terminal.

The wireless communication system 100 can multiplex the quick paging information over the same channels used for other information. For example, in an OFDM system, the wireless communication system 100 can broadcast the quick paging information across a channel employing some or all of the subcarrier frequencies. The subcarrier frequencies used to carry the quick paging information can be the same subcarriers used to carry other information to the access terminals. In this manner, the wireless communication system 100 can time division multiplex the quick paging channel with other channels of the system.

Figure 2:
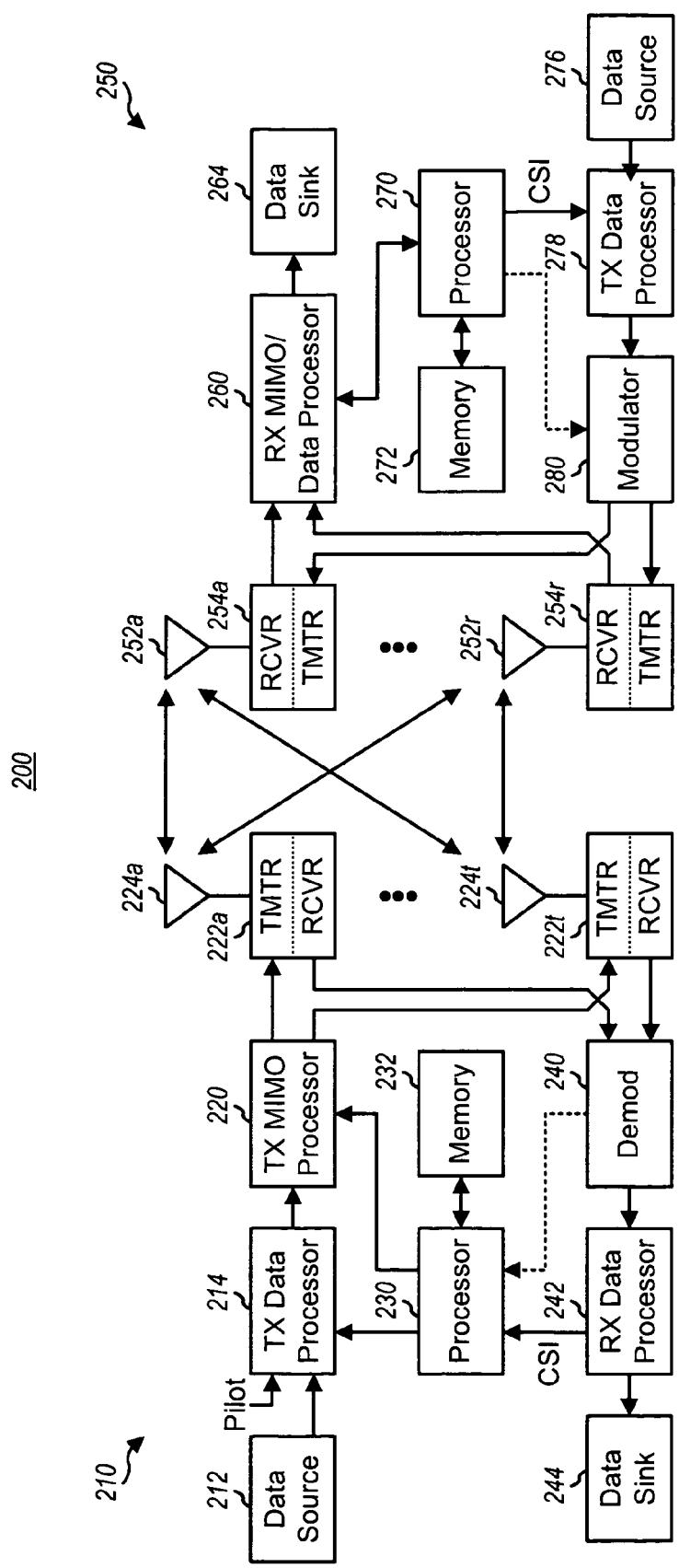
FIG. 2 is a simplified functional block diagram of an embodiment of a transmitter and receiver in a multiple access wireless communication system.

The above embodiments can be implemented utilizing transmit (TX) processor 220 or 260, processor 230 or 270, and memory 232 or 272, as shown in FIG. 2. The processes may be performed on any processor, controller, or other processing device and may be stored as computer readable instructions in a computer readable medium as source code, object code, or otherwise.

FIG. 2 is a simplified functional block diagram of an embodiment of a transmitter and receiver in a multiple access wireless communication system 200. At transmitter system 210, traffic data for a number of data streams is provided from a data source 212 to a transmit (TX) data processor 214. In an embodiment, each data stream is transmitted over a respective transmit antenna. TX data processor 214 formats, codes, and interleaves the traffic data for each data stream based on a particular coding scheme selected for that data stream to provide coded data. In some embodiments, TX data processor 214 applies beamforming weights to the symbols of the data streams based upon the user to which the symbols are being transmitted and the antenna from which the symbol is being transmitted. In some embodiments, the beamforming weights may be generated based upon channel response information that is indicative of the condition of the transmission paths between the access point and the access terminal. The channel response information may be generated utilizing CQI information or channel estimates provided by the user. Further, in those cases of scheduled transmissions, the TX data processor 214 can select the packet format based upon rank information that is transmitted from the user.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions provided by processor 230. In some embodiments, the number of parallel spatial streams may be varied according to the rank information that is transmitted from the user.

The modulation symbols for all data streams are then provided to a TX MIMO processor 220, which may further process the modulation symbols (for example, for OFDM). TX MIMO processor 220 then provides $N_T$ symbol streams to $N_T$ transmitters (TMTR) 222a through 222t. In certain embodiments, TX MIMO processor 220 applies beamforming weights to the symbols of the data streams based upon the user to which the symbols are being transmitted and the antenna from which the symbol is being transmitted from that users channel response information.

Each transmitter 222a through 222t receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide the rank number of "detected" symbol streams. The processing by RX data processor 260 is described in further detail below. Each detected symbol stream includes symbols that are estimates of the modulation symbols transmitted for the corresponding data stream. RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

The channel response estimate generated by RX processor 260 may be used to perform space, space/time processing at the receiver, adjust power levels, change modulation rates or schemes, or other actions. RX processor 260 may further estimate the signal-to-noise-and-interference ratios (SNRs) of the detected symbol streams, and possibly other channel characteristics, and provides these quantities to a processor 270. RX data processor 260 or processor 270 may further derive an estimate of the "effective" SNR for the system.

Processor 270 then provides estimated channel information, such as the Channel Quality Index (CQI), which may comprise various types of information regarding the communication link and/or the received data stream. For example, the CQI may comprise only the operating SNR. The CQI is then processed by a TX data processor 278, which also receives traffic data for a number of data streams from a data source 276, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to recover the CQI reported by the receiver system. The reported CQI is then provided to processor 230 and used to (1) determine the data rates and coding and modulation schemes to be used for the data streams and (2) generate various controls for TX data processor 214 and TX MIMO processor 220.

At the receiver, various processing techniques may be used to process the $N_R$ received signals to detect the $N_T$ transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

A MIMO channel formed by the $N_T$ transmit and $N_R$ receive antennas may be decomposed into $N_S$ independent channels, with $N_S \leq \min\{N_T, N_R\}$. Each of the $N_S$ independent channels may also be referred to as a spatial subchannel (or a transmission channel) of the MIMO channel and corresponds to a dimension.

In the multiple access wireless communication system 200 of FIG. 2, the TX data processor 214, in combination with the processor 230 and memory 232, can operate to determine the states of the various quick paging bits corresponding to the receiver systems 250 in the coverage area. The TX data processor 214 can be configured to encode the quick paging bits to generate one or more redundant bits, which can be forward error correction bits. The error correction bits can be, for example, a parity bit, a Cyclic Redundancy Code (CRC), or some other type of bits. The encoding can be systematic encoding or can be non-systematic encoding.

Each receiver system 250 can operate to receive the encoded quick paging information and recover the corresponding quick paging bit. The RX processor 260, in combination with the processor 270 and memory 272, can decode the quick paging information and determine whether its assigned quick paging bit is set to an active state. The receiver system 250 can detect or correct some errors in the quick paging information via the decoding process, and thereby reduce the probability of a missed page due to improper decoding or erasure of the assigned quick paging bit.

Figure 3:
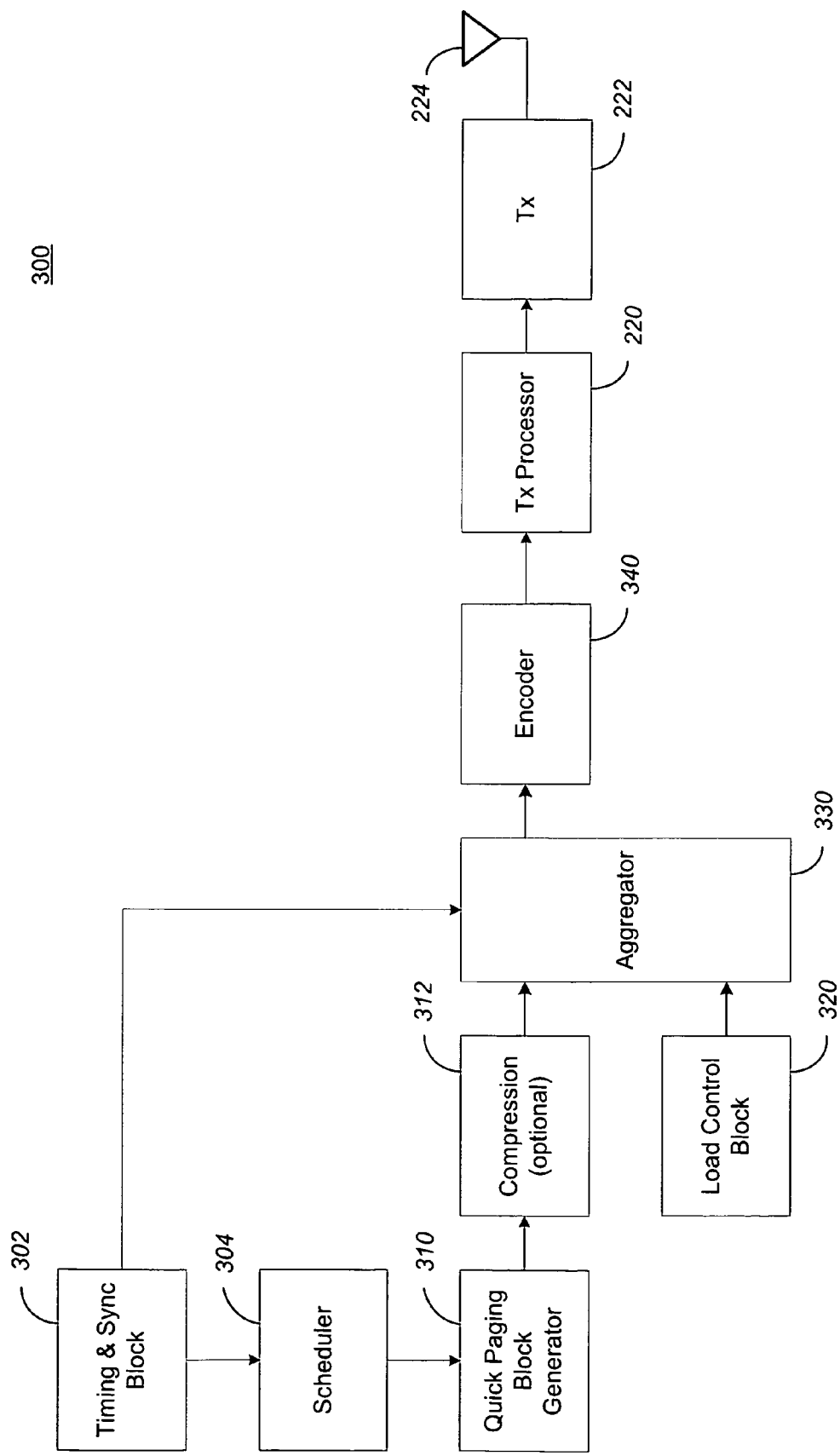
FIG. 3 is a simplified functional block diagram of an embodiment of a transmitter implementing the quick paging block.

FIG. 3 is a simplified functional block diagram of an embodiment of a transmitter 300 configured to implement an encoded quick paging channel. The transmitter 300 can be, for example, a portion of a transmitter system of FIG. 2, or a portion of an access point shown in FIG. 1. The transmitter 300 can be implemented within the multiple access wireless communication system of FIG. 1 to minimize the probability that the access terminals will miss a scheduled paging message through a missed or otherwise unrecovered portion of a quick paging block.

The simplified functional block diagram of FIG. 3 illustrates only a portion of the transmitter system associated with the quick paging channel (QPCH). The simplified functional block diagram does not show related blocks such as those associated with generating or mapping the paging messages that are associated with active quick paging bits.

The transmitter 300 embodiment of FIG. 3 includes a timing and synchronization module 302 coupled to a scheduler 304. The scheduler 304 is coupled to a quick paging block generator 310, and initiates generation of the quick paging block. The quick paging block generator 310 is optionally coupled to a quick paging block compression module 312 that can be included to generate a compressed quick paging block. The quick paging block compression module 312 is coupled to an aggregator 330, which can be a combiner. A load control block module 320 generates one or more load control bits. The output of the load control block module 320 is coupled to the aggregator 330. The aggregator 330 appends the load control bits to the quick paging block or compressed quick paging block, depending on whether the quick paging block is compressed.

The aggregator 330 couples the combined quick paging and load control bits to an encoder 340. The encoder 340 operates to encode the bits. The encoded output is coupled to a TX MIMO processor 220. The TX MIMO processor 220 couples the signal to a transmitter stage 222 that transmits the signal using an antenna 224.

The transmitter 300 embodiment of FIG. 3 includes a timing and synchronization module 302 that tracks the timing of the bits, frames, blocks, or packets generated by the transmitter 300. In one embodiment, the timing and synchronization module 302 maintains a bit synchronization, such that the bits generated by the transmitter 300 have substantially the same period. The timing and synchronization module 302 can also synchronize and track frame timing, where each frame includes a predetermined number of bits. In an OFDM system, it may be advantageous for each frame to include the information for at least one OFDM symbol.

A superframe can include a predetermined number of frames. Additionally, specific frames within the superframe can be dedicated to particular information. For example, each superframe can include a preamble of a predetermined length, such as six frames or six OFDM symbols.

The superframe preamble can be used to populate a broadcast channel that is transmitted to all access terminals within a coverage area of an access point. One portion of the superframe preamble can be allocated to the quick paging channel (QPCH). For example, the QPCH packet can be one frame or OFDM symbol within the superframe preamble. The length of the superframe preamble and the number of bits allocated to the QPCH packet can be varied based on the size of the information block allocated to the quick paging block.

In one embodiment, the number of bits allocated to the QPCH packet is static. In another embodiment, the number of bits allocated to the QPCH packet is dynamic and determined based at least in part on the number of quick paging bits that are active. Where the number of bits allocated to the QPCH packet is dynamic, the transmitter 300 can allocate a number of bits one of a predetermined set of QPCH packet lengths. Alternatively, the transmitter 300 can be configured to allocate any number of bits to the QPCH packet within a predetermined range or in increments of a single bit.

The transmitter 300 can be configured to send the size of the QPCH packet or quick paging block within the QPCH packet or some other message. In another embodiment, the transmitter 300 does not send the size of the QPCH packet, and relies on the receiver to determine the size of the packet.

The timing and synchronization module is coupled to a scheduler 304. The scheduler 304 tracks the communication links and information that is to be transmitted by the transmitter 300, and schedules the information, based in part on the system timing. In one embodiment, the scheduler 304 determines that the wireless communication system is attempting to set up an active communication session with an access terminal that is presently in an idle state.

The wireless communication system sends a paging message to the access terminal via the transmitter 300. Additionally, the wireless communication system sets one or more quick paging bits assigned to the access terminal or group of access terminals in which the desired access terminal is a member.

Although any number of quick paging bits can be assigned to each access terminal, typically only a single bit is assigned to each access terminal or access terminal group. For example, a quick paging block can be defined has having a predetermined number of quick paging bits, and a particular access terminal within the coverage area of an access point can be assigned to the nth quick paging bit in the quick paging block.

Although the description is primarily directed towards a single quick paging bit associated with a single access terminal within the particular coverage area, the wireless communication system may assign any number of quick paging bits to an access terminal. A set quick paging bit, whether active high or active low, indicates to the associated access terminal that a subsequent paging channel is direct to the access terminal.

As described above, a quick paging bit can be associated with a single access terminal or with a group of access terminals. When a quick paging bit is asserted, or otherwise set to an active state, the one or more access terminals associated with the quick paging bit know that at least one access terminal associated with the quick paging bit can expect a paging message. The wireless communication system can assign paging bits to groups of access terminals to minimize the total number of quick paging bits and thus the length of the quick paging block.

The quick paging block generator 310 determines from the scheduler 304 which quick paging bits to assert. In one example, the quick paging block generator sets to "1" each quick paging bit that is associated with an access that can expect a paging message, typically at the next opportunity for transmitting paging messages.

The quick paging block generator 310 couples the quick paging block having the properly asserted quick paging bits to an optional quick paging block compression module 312. The quick paging block compression module 312 operates to reduce the number of bits needed to represent the asserted quick paging bits.

The quick paging block compression module 312 can implement virtually any compression technique. The compression technique can implement one or more compression algorithms that can produce lossless compression, lossy compression or some combination of lossless compression or lossy compression of the quick paging block, depending on the number of quick paging bits asserted, the position of the quick paging bits in the quick paging block, or some combination thereof.

The quick paging block compression module 312 compresses the quick paging block of length $N_{QP\_BLK}$ to generate a compressed quick paging block of length $N_{QP\_MSG\_COMP}$. In one embodiment, the length of the compressed quick paging block can be variable and can be one of three possible lengths depending on the number of 1's representing set or otherwise asserted bits in the quick paging block.

In one embodiment, quick paging block compression module 312 generates the compressed quick paging block by sequentially indicating the position of each set bit in the quick paging block. The quick paging block compression module 312 can represent the position with a $\lceil \log_2(N_{QP\_BLK}) \rceil$ bit field, where the value of the field indicates the set bit position. The quick paging block compression module 312 may also reserve one or more values for the bit position field that represent special cases. For example, a value of 0 indicates no further bits asserted in the quick paging block. Additionally, a value of $2^{\wedge}(N_{QP\_BLK\_COMP})-1$ indicates that greater than some predetermined number of quick paging bits, e.g. 5 bits, are set in the quick paging block.

Thus, in this embodiment, the total number of unique bits in the Quick paging block is limited to $N_{QP\_BLK}-2$ to account for the 2 reserved values. Allowable bit positions may be in the range approximately 1 to $N_{QP\_BLK}-2$. If greater than the predetermined number of bits, e.g. 5 bits, are set in the quick paging block, the access network may interpret the message as having all bits set to one, and may transmit a single field with the corresponding reserved value. In one embodiment, the quick paging block compression module 312 does not include any field in the quick paging block that is indicative of the number of pages or number of bits included in the quick paging block. Instead, the transmitter 300 can rely on a receiver determining the number of pages and the number of bits in the quick paging block. For example, the receiver can test a number of hypotheses and thereby determine the number of bits in the quick paging block. In another embodiment, the quick paging block compression module 312 can include a field that is indicative of the number of quick pages or the number of bits in the compressed quick paging block. The receiver determines the number of quick pages or quick paging bits by extracting the appropriate field from the compressed quick paging block.

Table 1 shows the size of the compressed quick paging block as a function of the number of set bits in the quick paging block for the embodiment that does not include a field indicating the number of quick pages.

TABLE 1

| Lengths of Compressed Quick Paging Block | |
| --- | --- |
| Number of set bits in Quick Paging Block | $N_{QP\_MSG\_COMP}$ |
| 0, 1, or >5 | $\lceil \log_2(N_{QP\_BLK}) \rceil$ bits |
| 2 or 3 | $3\lceil \log_2(N_{QP\_BLK}) \rceil$ bits |
| 4 or 5 | $5\lceil \log_2(N_{QP\_BLK}) \rceil$ bits |

The output of the quick paging block compression module 312 is coupled to the aggregator 330. In the embodiment in which the quick paging block compression module 312 is omitted, the quick paging block from the quick paging block generator 310 is coupled to the aggregator 330.

The load control block module 320 concurrently generates a load control block having one or more bits. In one embodiment, the load control block is $N_{LC\_BLK}$ bits in length and is set by the access network. The load control block can represent any additional information that is directed to one or more access terminals as part of the quick paging channel information. The load control information can be virtually any type of information. For example, the load control information can indicate a class of access terminals that are permitted to access the quick paging information. Alternatively, the load control information can indicate a class of access terminals from which the quick paging information is applicable. Access terminals not belonging to the class indicated by the load control block information can ignore the message.

The aggregator 330 operates to concatenate the compressed quick paging block or the quick paging block with the load control block. In this embodiment, a QPCH packet carries two information blocks: the quick paging block and the load control block. The aggregator 330 can append the load control block to the end of the quick paging or compressed quick paging block.

The aggregator 330 couples the concatenated quick paging and load control blocks to the encoder 340. The encoder 340 operates to encode the concatenated information. The encoder 340 can implement virtually any type of encoding, and can implement, for example, systematic encoding, block coding, convolutional encoding, turbo encoding, and the like, or some combination thereof. The output of the encoder 340 represents the quick paging packet.

The QPCH packet may be encoded, channel interleaved, repeated, data-scrambled and modulated using any one or multiple techniques. In an embodiment, a MACID of 0 and a packet format of 0 may be used to generate an initial state of a scrambler (not shown).

In one embodiment, the encoder 340 implements a systematic code, such that the redundant bits are appended to the end of the unmodified concatenated quick paging and load control blocks. A systematic code can generate, for example, a Cyclic Redundancy Code (CRC), a syndrome, a parity bit, or some other code bits that provide a level of redundancy.

The encoder 340 couples the encoded QPCH packet to the TX MIMO Processor 220. In one embodiment, the TX MIMO Processor 220 processes the encoded QPCH packet and produces an OFDM symbol having the complete QPCH packet information. The TX MIMO Processor 220 can generate the OFDM symbol allocating the QPCH packet information across all of the OFDM subcarriers, or across a predetermined subset of all of the subcarriers. In such an embodiment, the symbol having the QPCH packet is time division multiplexed with other channels in the OFDM system.

In some embodiments, the TX MIMO Processor 220 may be able to modulate the QPCH packet onto the subcarriers using any one of a predetermined set of modulation types. In one embodiment, the TX MIMO Processor 220 uses QPSK modulation for all the modulation symbols of the QPCH. In other embodiments, the TX MIMO Processor 220 may use some other type of modulation, such as BPSK.

In another embodiment, the QPCH packet information is allocated to a logical channel that is mapped to fewer than all of the subcarriers in the OFDM system. In such an embodiment, the logical channel to physical subcarrier mapping can be static or can be dynamic.

If the multiple access wireless communication system employs frequency hopping (FH), the QPCH can be assigned as a logical channel, sometimes referred to as a hop port, and the logical channel can be mapped to physical channels according to a predetermined frequency hopping algorithm. Thus, in a frequency hopping OFDMA system, the physical subcarrier frequencies assigned to the logical channels change over time. For example, the frequency hopping algorithm can periodically update the logical channel to physical subcarrier mapping, for example, each OFDM symbol, each slot, or following some other predetermined number of OFDM symbols.

The TX MIMO Processor 220 couples the OFDM symbol to the transmitter stage 222. The transmitter stage 222 transmits the symbol including the QPCH packet using the antenna 224.

In the QPCH embodiments described above, the transmitter broadcasts the QPCH packet in n OFDM symbol occurring during a preamble portion of a superframe. The transmitter broadcasts the QPCH packet to all of the access terminals in the coverage area.

By transmitting the QPCH symbol in a preamble, a large number of access terminals may be addressed simultaneously. This is because, for example, each data bit in the QPCH packet may be addressed to a different mobile. The transmission of the QPCH in a single OFDM symbol allows several access terminals to wakeup concurrently to monitor their respective quick paging bits in the same OFDM symbol.

Further, all the bits in one TDM slot are jointly encoded and can be encoded with a strong CRC, where a strong CRC refers to redundant coding bits that provide a high probability of successful receipt of any particular quick paging bit in the packet. This has two advantages. First, the coding gain due to joint encoding provides additional margin not available using a single bit. Second, because of the strong CRC, the probability of a missed page becomes very low.

Figure 4:
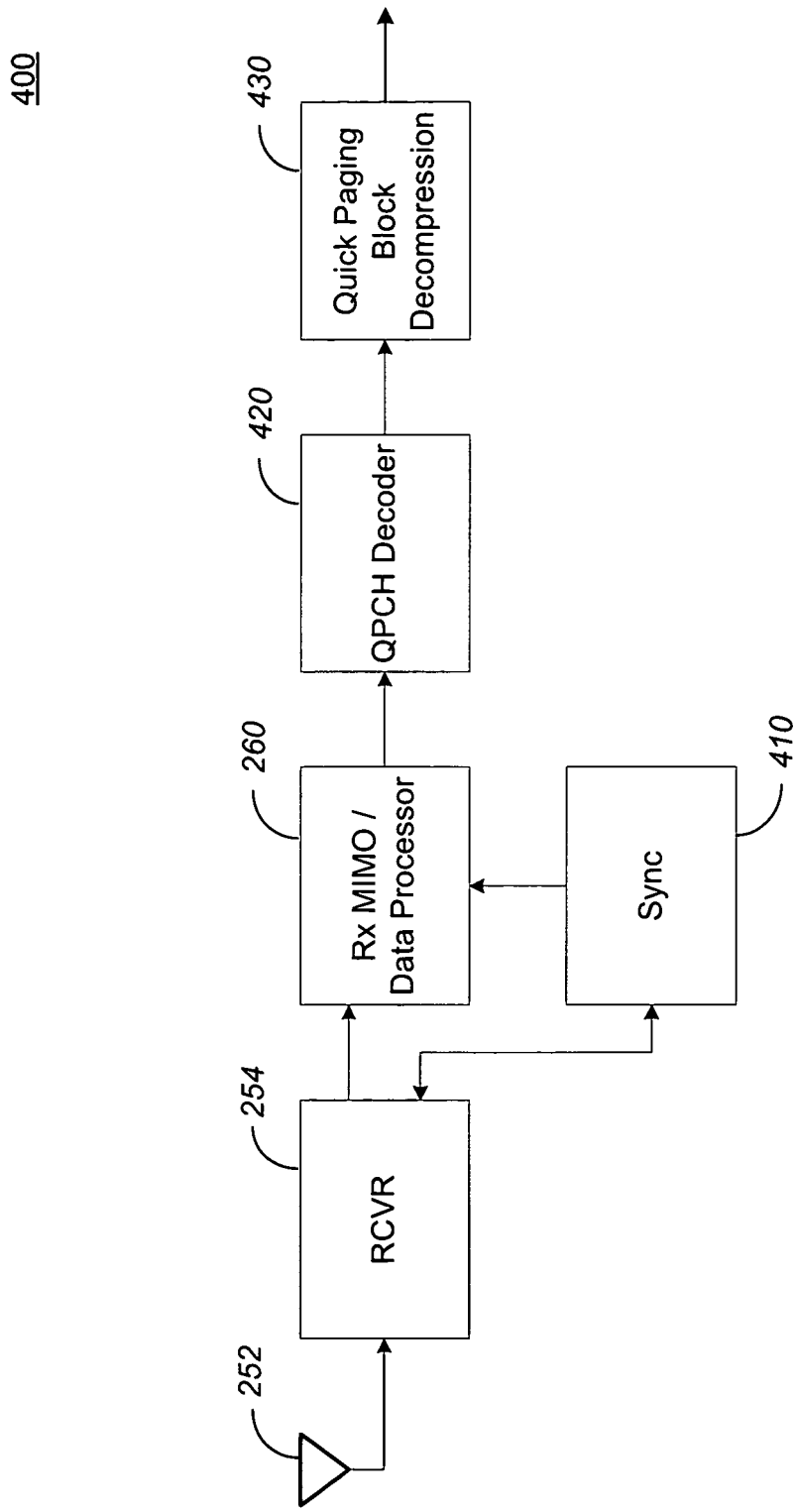
FIG. 4 is a simplified functional block diagram of an embodiment of a receiver configured to process the quick paging block.

FIG. 4 is a simplified functional block diagram of an embodiment of a receiver 400 configured to process the jointly encoded QPCH packet. The receiver 400 can be a portion of each of the access terminals of FIG. 1, and can be a portion of the receiver system of FIG. 2. The simplified functional block diagram of FIG. 4 illustrates only those portions of the receiver 400 associated with processing the QPCH packet. The receiver 400 typically includes other processing modules.

The receiver 400 operates to perform roughly the complement of the process used in the transmitter system to generate the QPCH packet. The receiver 400 receives the OFDM symbol containing the QPCH packet and recovers the QPCH packet. The receiver 400 uses the redundant encoding information to increase the probability that the underlying bits in the quick paging block and load control block are successfully recovered. The receiver 400 uses the recovered quick paging bit information to determine whether to awaken or remain active to monitor for a subsequent paging channel message.

In one embodiment, if the CRC fails, the access terminal monitors the paging channel as a default action. If the CRC succeeds and a corresponding quick paging bit is set, the access terminal is instructed to monitor the paging channel. If the CRC succeeds, and the assigned quick paging bit is 0, or otherwise unasserted, the access terminal returns to a sleep state. The probability of misdetection is equal to the probability of misdetecting a CRC error, and that probability is very low with a strong CRC, such as a CRC having 8 or more bits.

The receiver 400 includes an antenna 252 that couples a received signal to a receiver front end 254. A synchronization module 410 operates in conjunction with the receiver front end. The synchronization module 410 determines, based on the received signal, the symbol timing and from the symbol timing the frame and superframe timing. The receiver front end 254 utilizes the synchronization information to recover the OFDM symbols, and in particular, the OFDM preamble having the OFDM symbol with the QPCH packet.

The receiver front end 254 couples the OFDM symbol having the QPCH packet to the RX MIMO data processor 260. The RX MIMO data processor 260 operates to demodulate the OFDM subcarriers on which the QPCH packet is modulated to recover the QPCH packet.

The RX MIMO data processor 260 demodulates the subcarriers in a complementary manner to which they were modulated. That is, if the subcarriers are QPSK modulated, the RX MIMO data processor 260 performs QPSK demodulation of the subcarriers.

The QPCH packet is coupled to the QPCH decoder 420. The QPCH decoder 420 operates to decode the QPCH packet in a complementary fashion to the manner in which the packet was encoded in transmitter. In general, the QPCH decoder 420 performs the complement of the processing performed in the transmitter, including the complement of any interleaving, encoding, scrambling, repetition, and the like or combination thereof performed when generating the QPCH packet.

If the QPCH is encoded with a systematic code, the receiver 400 can conditionally process the redundant coding bits based on the value of the associated quick paging bit. For example, the receiver 400 can decide not to process the coding bits if the associated quick paging bit. In such an embodiment, the receiver 400 can trade-off the processing energy associated with the decoding process for the probability of processing a false asserted bit. In other embodiments, the receiver can be configured to always examine the coding bits, such as the CRC or other redundant bits. In such an embodiment, the decoder 420 can operate to identify a presence of a received bit error, and in some instances, can identify the one or more erroneous received bits. The decoder 420 can then operate to correct the identified erroneous bits.

The output of the decoder 420 or a portion of the QPCH packet can optionally be coupled to a quick paging block decompression module 430. In the embodiment in which the QPCH includes a compressed quick paging block and a load control block, the decoder 420 can couple at least the compressed quick paging block to the quick paging block decompression module 430, and need not couple any of the bits from the load control block to the decompression module.

The quick paging block decompression module 430 operates to decompress the compressed quick paging block in a manner that is complementary to the process used to compress the quick paging block. In the embodiment described above, where the quick paging block is compressed by including the positions of up to a predetermined number of quick paging bits, the quick paging block decompression module 430 operates to initially determine the number of asserted quick paging bits represented in the compressed quick paging block. The quick paging block decompression module 430 can determine the length of the compressed quick paging block and can then recover each of the positions of any asserted quick paging bits.

The quick paging block decompression module 430 can recover the quick paging block and output the quick paging block. A subsequent module such as a paging module (not shown) can examine the quick paging block to determine if the quick paging block assigned to the access terminal is asserted.

In another embodiment, the quick paging block decompression module 430 can examine the positions of the asserted bits in the compressed quick paging block to determine whether the quick paging bit associated with the access terminal is asserted. In this embodiment, the quick paging block decompression module 430 is not required to actually recover the quick paging block.

Other modules within the receiver 400 such as the paging module (not shown) can operate on the quick paging block information. If the quick paging bit associated with the access terminal is asserted, the paging module can direct the receiver to monitor for the paging message. Alternatively, if the quick paging bit associated with the access terminal is not asserted, the paging module can direct the receiver to transition to a sleep state until the next occurrence of the QPCH.

Figure 5:
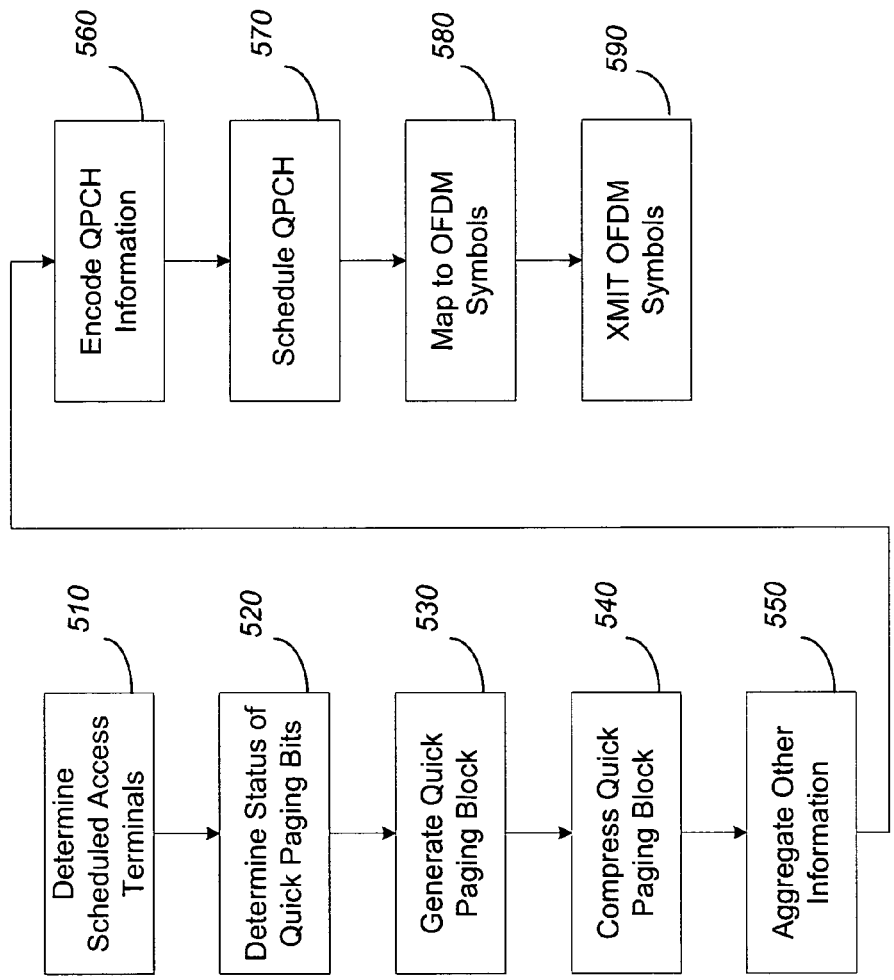
FIG. 5 is a simplified flowchart of an embodiment of a method of generating a quick paging block.

FIG. 5 is a simplified flowchart of an embodiment of a method 500 of generating a quick paging block having one or more asserted quick paging bits for notifying an access terminal of a paging message. The method 500 can be implemented, for example, in an access point of FIG. 1. More particularly, the method 500 can be implemented, for example, by the transmitter system of FIG. 2 or transmitter of FIG. 3.

The method 500 begins at block 510 where the transmitter in an access point determines the number and identity of the access terminals scheduled to receive paging messages. Typically, the scheduled access terminals are those access terminals presently in an idle or sleep state for which a communication link is desired and there is presently scheduled a paging message that has yet to be sent or for which a prior paging message has yet to by acknowledged.

The transmitter proceeds to block 520 to determine the status of the quick paging bits in a quick paging block based on the scheduled paging messages. The transmitter can be configured to set or otherwise assert the quick paging bits associated with the one or more access terminals scheduled to receive a paging message. Additionally, the transmitter can be configured to clear or otherwise de-assert the quick paging bits associated with those access terminals for which no paging message is scheduled. In one embodiment, the bit values may be determined by using an Idle State Protocol in a Connection Layer.

The transmitter proceeds to block 530 and generates a quick paging block having the quick paging bits associated with the scheduled access terminals asserted and all other quick paging bits de-asserted. After generating the quick paging block, the transmitter optionally proceeds to block 540 and compresses the quick paging block to generate the compressed quick paging block. In some embodiments, the transmitter does not compress the quick paging block.

The transmitter proceeds to block 550 and aggregates the compressed quick paging block with other information that is sent over the QPCH. In one embodiment, the transmitter appends a load control block to the quick paging block, which is either compressed or uncompressed, depending on the embodiment. In other embodiments, the transmitter may append or prepend other information to the quick paging block.

The transmitter proceeds to block 560 and encodes the QPCH information. The encoder operates on the quick paging block and additional information. Therefore, the encoding of the quick paging bits is performed jointly. Quick paging bits are encode with other quick paging bits as well as other information, such as the load control block. The encoded output represents the QPCH packet.

The transmitter proceeds to block 570 and schedules the QPCH packet for transmission. In one embodiment, the transmitter schedules the QPCH packet to be transmitted in a symbol from a plurality of OFDM symbols in a superframe preamble. If the QPCH packet occupies the information carrying subcarriers of the OFDM system, all of the other channels, including traffic channels and other overhead channels, in the system are time domain multiplexed with the QPCH. Similarly, if the QPCH occupies only a subset of information carrying subcarriers in the OFDM system, at least a portion of other channels are time domain multiplexed with the QPCH, provided the subcarriers are not dedicated to the QPCH.

The transmitter proceeds to block 580 and maps the QPCH packet to an OFDM symbol at the appropriate time determined by the schedule. In one embodiment, the OFDM symbol is a symbol in the first six preamble symbols occurring in a superframe. Of course, other embodiments can have other symbol positions.

The transmitter can modulate the QPCH packet onto the subcarriers using a predetermined modulation type. The modulation type can be selected to be a modulation type that is relatively noise insensitive, while supporting a modest information throughput. In one embodiment, the transmitter QPSK modulates the QPCH packet onto the subcarriers of the OFDM symbol.

After generating the OFDM symbol, the transmitter proceeds to block 590 and transmits the OFDM symbol including the QPCH packet. The transmitter can, for example, frequency convert the OFDM symbol to a desired RF operating band and wirelessly transmit the OFDM symbol in the RF operating band.

Figure 6:
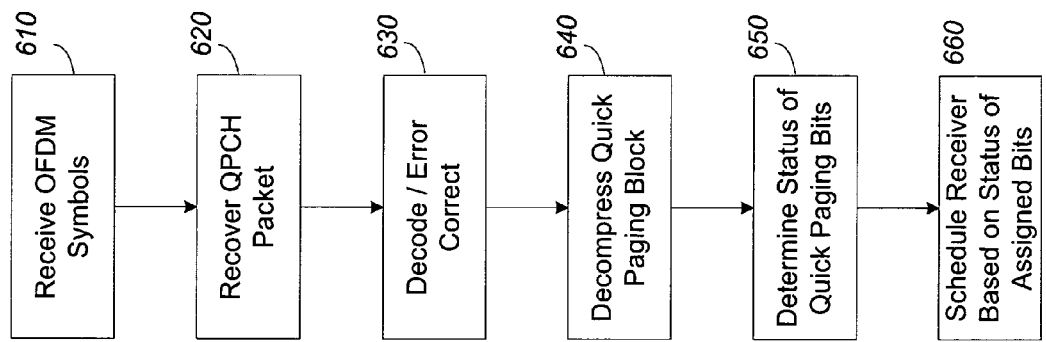
FIG. 6 is a simplified flowchart of an embodiment of a method of processing a quick paging block.

FIG. 6 is a simplified flowchart of an embodiment of a method 600 of processing a quick paging block. The method 600 can be implemented, for example, in an access terminal of FIG. 1, a receiver system of FIG. 2, or a receiver of FIG. 3. In general, the method 600 of FIG. 6 operates as a complement to the QPCH generating method of FIG. 5.

The method 600 begins a block 610 where the receiver receives one or more OFDM symbols. At least one symbol may include the QPCH packet. For example, in the method of FIG. 5, the QPCH packet can be contained within a single OFDM symbol. In one embodiment, the receiver synchronizes with a superframe timing and extracts at least the OFDM symbol associated with the QPCH packet.

The receiver proceeds to block 620 and recovers the QPCH packet from the appropriate OFDM symbols. In one embodiment, the receiver demodulates the subcarriers of the OFDM symbol and recovers the QPCH packet information.

The receiver proceeds to block 630 and decodes the QPCH packet to determine the presence of errors, if any. Depending on the type of encoding used to generate the QPCH packet, the receiver may have the ability to correct one or more errors in the QPCH packet as a result of the decoding process. The receiver also performs the complement of any coding operation such as those that operate to scramble, interleave, repeat, or otherwise process the QPCH block information.

The receiver optionally proceeds to block 640 and decompresses the quick paging block portion of the QPCH packet. In one embodiment, the receiver determines the length of a variable length quick paging block and decompresses the variable length compressed quick paging block.

The receiver proceeds to block 650 and determines the status of the quick paging bits to determine if the quick paging bit associated with the receiver, or access terminal having the receiver, is asserted. The process of decompressing the quick paging block can be optional, depending on the manner in which the block is compressed. In the embodiment in which the quick paging block is compressed by indicating the position of the asserted quick paging bits, the receiver can determine if the associated quick paging bit is asserted without needing to recover the uncompressed quick paging block.

After the receiver determines the state of the associated quick paging bit, the receiver proceeds to block 660 to direct the operation of the receiver based on the status f the bit. If the associated quick paging bit is asserted, the receiver can monitor a paging channel at an appropriate time for a paging message. If the receiver determines that the associated quick paging bit is not asserted, the receiver may transition to a sleep state until the next scheduled QPCH packet.

Figure 7:
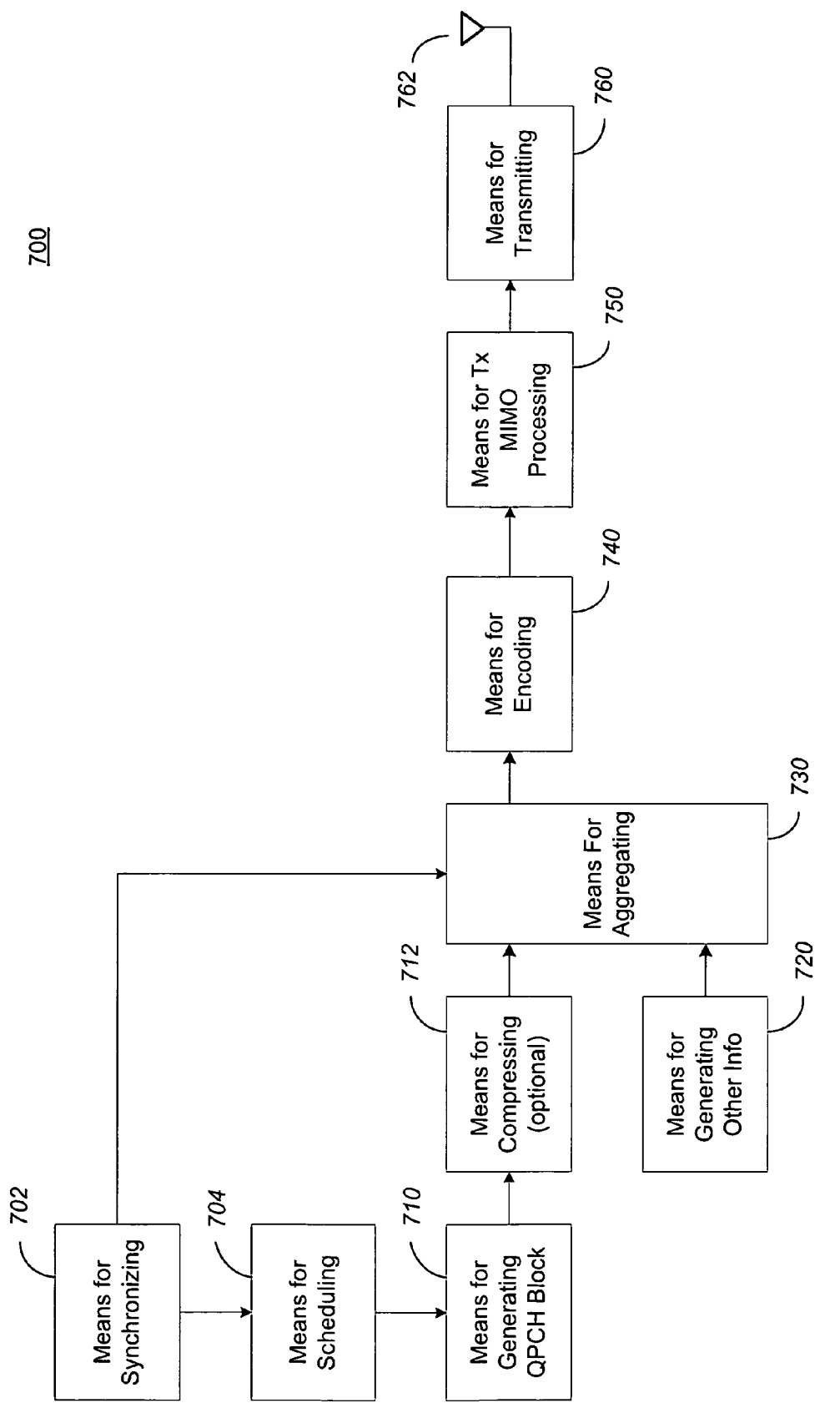
FIG. 7 is a simplified functional block diagram of an embodiment of a transmitter implementing the quick paging block.

FIG. 7 is a simplified functional block diagram of an embodiment of a transmitter 700 implementing the quick paging block. The transmitter 700 includes means for synchronizing timing with a system time 702 that is coupled to a means for scheduling information 704 according to the means for synchronizing timing 702. The means for scheduling information 704 can be configured to determine which of a plurality of access terminals has paging messages scheduled for transmission.

The means for scheduling information 704 is coupled to a means for generating a QPCH block 710 that is configured to generate a quick paging block based on the scheduled paging channel transmissions. The means for scheduling information 704 operates as a means for determining a presence of a scheduled message for an access terminal. The means for generating a QPCH block 710 is configured as a means for setting a quick paging bit from a plurality of quick paging bits in a quick paging block. The means for generating a QPCH block 710 sets the quick paging bit corresponding to the access terminal having a scheduled message. The means for generating a QPCH block 710 couples the quick paging block to a means for aggregating information 730.

A means for generating additional information 720 is configured to generate one or more bits, blocks, or fields of information that is to be included with the QPCH packet. The means for generating additional information 720 couples the additional information to the means for aggregating information 730.

The means for aggregating information 730 operates to combine, aggregate, or otherwise concatenate the quick paging block with the additional information. In one embodiment, a load control block is concatenated with the quick paging block to generate a QPCH packet that is a concatenation of the quick paging block and the load control block.

The output of the means for aggregating information 730 is coupled to a means for encoding the QPCH packet 740 that operates to encode the concatenated QPCH packet. The means for encoding the QPCH packet 740 encodes a quick paging block and generates an encoded quick paging packet. That is, the means for encoding the QPCH packet 740 jopintly encodes each quick paging bit with at least one additional quick paging bit corresponding to a distinct access terminal. The means for encoding the QPCH packet 740 couples the encoded QPCH packet to a means for TX processing 750, which may be for TX MIMO processing depending on the system. The means for TX processing 750 operates to generate at least one OFDM symbol having at least a portion of the encoded QPCH packet. The means for TX processing 750 produces at least one OFDM symbol from a stream of OFDM symbols, and thus time division multiplexes the encoded quick paging packet having the quick paging block with distinct information over a channel. The output of the means for TX processing 750 is coupled to a means for transmitting 760 that operates to process the at least one OFDM symbol to an RF frequency for transmission using the antenna 762.

As seen in FIG. 7, means 702, 704, 712, 720, and 750 are optional and may be omitted based upon the application and system design.

Figure 8:
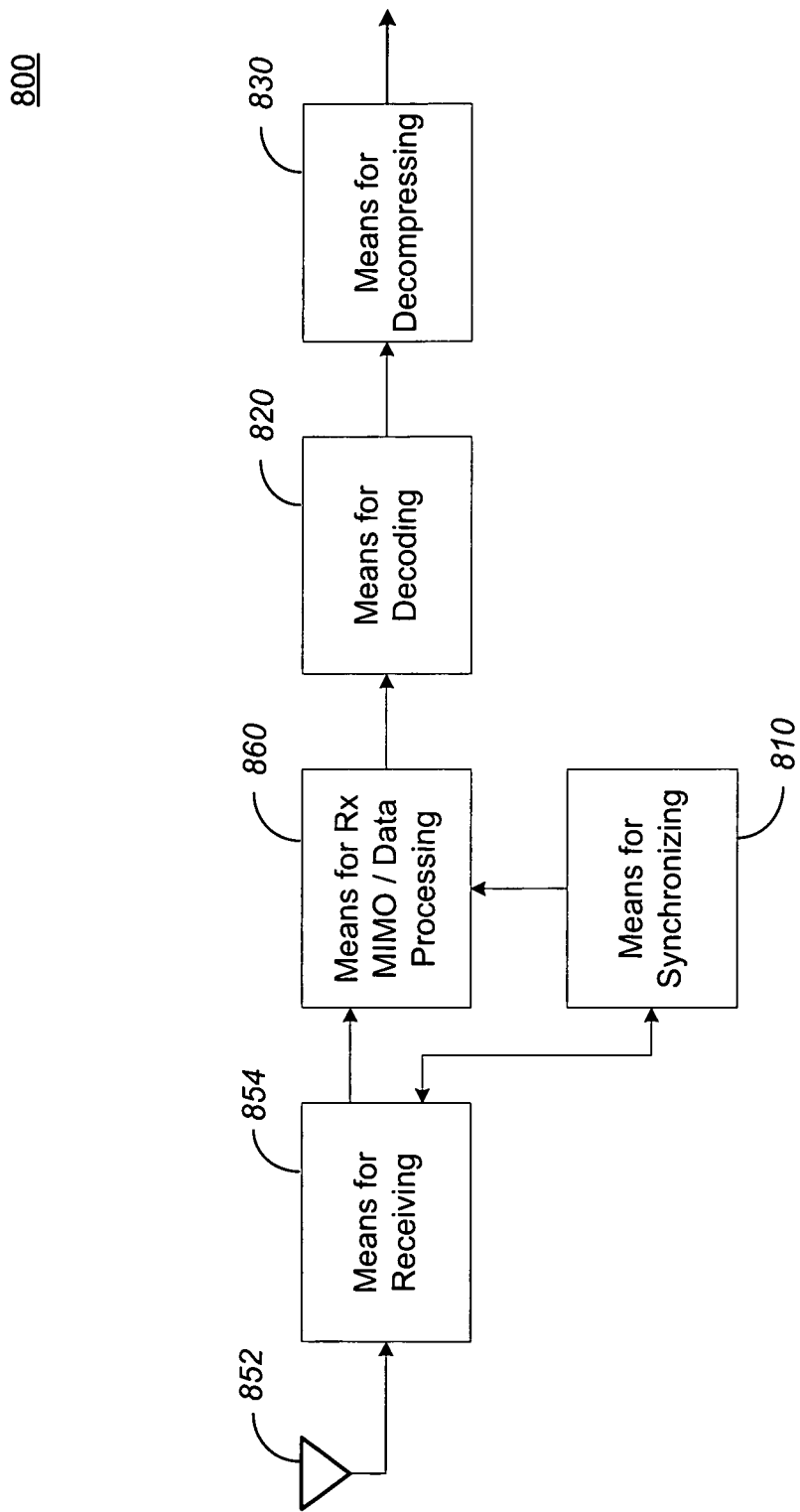
FIG. 8 is a simplified functional block diagram of an embodiment of a receiver configured to process the quick paging block.

FIG. 8 is a simplified functional block diagram of an embodiment of a receiver 800 configured to process the quick paging block. The receiver 800 includes an antenna 852 configured to receive the OFDM symbol having the QPCH packet.

The antenna couples the OFDM symbol to a means for receiving the OFDM information 854 that is configured to receive a quick paging packet and process the received OFDM symbols to baseband OFDM symbols or samples. A means for synchronizing timing 810 operates to synchronize the received samples to align with the OFDM symbol timing.

The output of the means for receiving the OFDM information 854 is coupled to a means for RX MIMO Processing 860 that is configured to process the OFDM symbol to recover the underlying information modulated on the OFDM subcarriers. For the OFDM symbol having the QPCH packet, the means for RX MIMO Processing 860 demodulates the OFDM subcarriers to recover the encoded QPCH packet.

The means for RX MIMO Processing 860 couples the encoded QPCH packet to a means for decoding the QPCH packet 820 that is configured to decode the encoded QPCH packet in order to recover the QPCH packet including the quick paging block. The output of the means for decoding the QPCH packet 820 is optionally coupled to a means for decompressing the QPCH block 830 of the QPCH packet in order to determine which of the quick paging bits is asserted. The means for decompressing the QPCH block 830 can also operate as a means for determining a status of a quick paging bit associated with a particular access terminal based on the output of the decompressing process. The receiver can determine what action to take based on the state of the associated quick paging bit.

A quick paging channel format and quick paging channel packet, and process for generating the quick paging packet have been described herein. A jointly encoded quick paging packet allows redundant bits to be generated to assist in the accurate recovery of the quick paging bits at a wireless receiver. The improved ability to accurately recover the quick paging bits reduces the probability of missing a paging message directed to the receiver.

As used herein, the term coupled or connected is used to mean an indirect coupling as well as a direct coupling or connection. Where two or more blocks, modules, devices, or apparatus are coupled, there may be one or more intervening blocks between the two coupled blocks.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

For a firmware and/or software implementation, the techniques described herein may be implemented with modules (e.g., procedures, functions, and so on) that perform the functions described herein. The firmware and/or software codes may be stored in a memory and executed by a processor. The memory may be implemented within the processor or external to the processor.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of notifying an access terminal, the method comprising:
    determining presence of a scheduled message for the access terminal;
    setting a quick paging bit from a plurality of quick paging bits in a quick paging block, the quick paging bit corresponding to the access terminal;
    compressing the quick paging block to generate a compressed quick paging block;
    encoding the compressed quick paging block to generate an encoded quick paging packet;
    generating at least one Orthogonal Frequency Division Multiplex (OFDM) symbol having at least a portion of the encoded quick paging block; and
    transmitting the at least one OFDM symbol;
    wherein compressing the quick paging block comprises:
        determining a number of asserted quick paging bits from the plurality of quick paging bits; and
        generating successive fields indicating positions of the asserted quick paging bits within the quick paging block if the number of asserted bits is less than a predetermined amount.

2. The method of claim 1, wherein the generating the at least one OFDM symbol comprises generating at least one OFDM symbol having an entire encoded quick paging block.

3. The method of claim 1, further comprising:
    Generating additional bits distinct from the quick paging block; and
    Appending the additional bits to the quick paging block prior to encoding the quick paging block.

4. The method of claim 1, wherein compressing the quick paging block comprises:
    determining a number of asserted quick paging bits from the plurality of quick paging bits; and
    generating a predetermined value representative of the quick paging block if the number of asserted quick paging bits is greater than a predetermined amount.

5. The method of claim 1, wherein encoding the quick paging block comprises systematic encoding the quick paging block.

6. The method of claim 1, wherein encoding the quick paging block comprises generating a Cyclic Redundancy Code of a packet including the quick paging block.

7. The method of claim 1, wherein transmitting the at least one OFDM symbol comprises time division multiplexing the at least one OFDM symbol with other information over at least one channel.

8. The method of claim 1, wherein transmitting the at least one OFDM symbol comprises transmitting the at least one OFDM symbol during a superframe preamble.

9. A method of notifying an access terminal, the method comprising:

setting a quick paging bit corresponding to the access terminal in a quick paging block having a plurality of bits corresponding to a plurality of access terminals;

compressing the quick paging block to generate a compressed quick paging block; and encoding the compressed quick paging block to generate an encoded quick paging block, wherein the compressing the quick paging block comprises:

determining a number of asserted quick paging bits from the plurality of quick paging bits; and generating successive fields indicating positions of the asserted quick paging bits within the quick paging block if the number of asserted bits is less than a predetermined amount.

10. The method of claim 9, further comprising time division multiplexing the encoded quick paging block with other information over at least one channel of a wireless communication system.

11. The method of claim 9, further comprising:

generating an Orthogonal Frequency Division Multiplex (OFDM) symbol having at least a portion of the encoded quick paging block; and transmitting the OFDM symbol.

12. The method of claim 11, wherein generating the OFDM symbol comprises modulating at least a portion of the encoded quick paging block onto substantially all signal carrying subcarriers of the OFDM symbol.

13. The method of claim 11, wherein generating the OFDM symbol comprises Quadrature Phase Shift Keying (QPSK) modulating at least a portion of the encoded quick paging block onto at least a subset of subcarriers of the OFDM symbol.

14. A method of processing a quick paging message, the method comprising:

receiving a quick paging packet;

decoding the quick paging packet to generate a quick paging block;

decompressing the quick paging block; and determining a status of a quick paging bit associated with an access terminal based on an output of the decompressing process, wherein the decompressing the quick paging block comprises:

determining a number of asserted quick paging bits represented in the quick paging block; and examining positions of the asserted quick paging bits in successive fields within the quick paging block to determine whether a quick paging bit associated with an access terminal is asserted.

15. The method of claim 14, wherein receiving the quick paging packet comprises receiving the quick paging packet including the quick paging block and a load control block.

16. The method of claim 14, wherein receiving the quick paging packet comprises receiving an Orthogonal Frequency Division Multiplex (OFDM) symbol having at least a portion of the quick paging packet.

17. The method of claim 14, wherein determining the status of the quick paging bit comprises:

determining a position of an asserted bit in the quick paging block based on an output of the decompressing process; and comparing the position to a position of the quick paging bit associated with the access terminal.

18. An apparatus for generating a quick paging message, the system comprising:

a scheduler configured to determine scheduled a paging message for an access terminal;

a quick paging block generator coupled to the scheduler and configured to assert a quick paging bit corresponding to the access terminal and configured to generate a quick paging block having at least the quick paging bit and a distinct quick paging bit corresponding to a distinct access terminal;

a compression block coupled to the quick paging block generator, the compression block being configured to determine a number of asserted quick paging bits from a plurality of quick paging bits and to generate successive fields indicating positions of the asserted quick paging bits within the quick paging block if the number of asserted bits is less than a predetermined amount;

an encoder coupled to the quick paging block generator and configured to generate an encoded quick paging packet based on the quick paging block; and a transmit processor coupled to the encoder and configured to generate at least one Orthogonal Frequency Division Multiplex (OFDM) symbol having at least a portion of the encoded quick paging packet.

19. The apparatus of claim 18, wherein the:

compression block is configured to compress the quick paging block and to generate a compressed quick paging block; and wherein the encoder is coupled to the compression block and is configured to generate the encoded quick paging packet based on the compressed quick paging block.

20. The apparatus of claim 18, further comprising:

a load control module configured to generate load control block having at least one bit distinct from a quick paging bit;

an aggregator coupled to the quick paging block generator and the load control block and configured to aggregate the quick paging block with the load control block; and wherein the encoder is configured to encode an aggregated output of the aggregator.

21. The system of claim 18, further comprising a transmitter coupled to the transmit processor and configured to transmit the at least one OFDM symbol during a superframe preamble.

22. The system of claim 18, further comprising a transmitter coupled to the encoder and configured to time division multiplex the encoded quick paging packet over at least one channel with other information.

23. An apparatus for notifying an access terminal, the system comprising:

means for determining presence of a scheduled message for the access terminal;

means for setting a quick paging bit from a plurality of quick paging bits in a quick paging block, the quick paging bit corresponding to the access terminal;

means for compressing the quick paging block to generate a compressed quick paging block;

means for encoding the compressed quick paging block to generate an encoded quick paging packet;

means for generating at least one Orthogonal Frequency Division Multiplex (OFDM) symbol having at least a portion of the encoded quick paging block; and means for transmitting the at least one OFDM symbol, wherein the means for compressing the quick paging block determines a number of asserted quick paging bits from the plurality of quick paging bits and generates successive fields indicating positions of the asserted quick paging bits within the quick paging block if the number of asserted bits is less than a predetermined amount.

24. The apparatus of claim 23, wherein the means for generating the at least one OFDM symbol comprises means for generating at least one OFDM symbol having an entire encoded quick paging block.

25. The apparatus of claim 23, further comprising:
means for generating additional bits distinct from the quick paging block; and
means for appending the additional bits to the quick paging block prior to encoding the quick paging block.

26. The apparatus of claim 23, wherein the means for compressing the quick paging block comprises:
means for determining a number of asserted quick paging bits from the plurality of quick paging bits; and
means for generating a predetermined value representative of the quick paging block if the number of asserted quick paging bits is greater than a predetermined amount.

27. An apparatus for notifying an access terminal, the system comprising:
means for setting a quick paging bit corresponding to the access terminal;
means for compressing the quick paging block to generate a compressed quick paging block;
means for jointly encoding the quick paging bit with at least one additional quick paging bit corresponding to a distinct access terminal to generate an encoded quick paging block; and
means for time division multiplexing the encoded quick paging block with distinct information over a channel,
wherein the means for compressing the quick paging block determines a number of asserted quick paging bits from the plurality of quick paging bits and generates successive fields indicating positions of the asserted quick paging bits within the quick paging block if the number of asserted bits is less than a predetermined amount.

28. The apparatus of claim 27, further comprising means for time division multiplexing the encoded quick paging block with other information over at least one channel of a wireless communication system.

29. The apparatus of claim 27, further comprising:
means for generating at least one Orthogonal Frequency Division Multiplex (OFDM) symbol having at least a portion of the encoded quick paging block.

30. The apparatus of claim 29, wherein the means for generating the at least one OFDM symbol comprises modulating at least a portion of the encoded quick paging block onto substantially all signal carrying subcarriers of the at least one OFDM symbol.

31. The apparatus of claim 29, wherein generating the at least one OFDM symbol comprises Quadrature Phase Shift Keying (QPSK) modulating at least a portion of the encoded quick paging block onto at least a subset of subcarriers of the at least one OFDM symbol.

32. An apparatus for processing a quick paging message, the system comprising:
means for receiving a quick paging packet;
means for decoding the quick paging packet to generate a quick paging block;
means for decompressing the quick paging block; and
means for determining a status of a quick paging bit associated with an access terminal based on an output of the decompressing process,
wherein the means for decompressing the quick paging block determines a number of asserted quick paging bits represented in the quick paging block and examines positions of the asserted quick paging bits in successive fields within the quick paging block to determine whether a quick paging bit associated with an access terminal is asserted.

33. The apparatus of claim 32, wherein the means for receiving the quick paging packet comprises means for receiving the quick paging packet including the quick paging block and a load control block.

34. The apparatus of claim 32, wherein the means for receiving the quick paging packet comprises means for receiving at least one Orthogonal Frequency Division Multiplex (OFDM) symbol having at least a portion of the quick paging packet.

35. The apparatus of claim 32, wherein the means for determining the status of the quick paging bit comprises:
means for determining a position of an asserted bit in the quick paging block based on an output of the decompressing process; and
means for comparing the position to a position of the quick paging bit associated with the access terminal.

36. A non-transitory computer readable medium including computer readable instructions that may be utilized by one or more processors, the instructions comprising:
instructions for determining presence of a scheduled message for the access terminal;
instructions for setting a quick paging bit from a plurality of quick paging bits in a quick paging block, the quick paging bit corresponding to the access terminal;
instructions for compressing the quick paging block to generate a compressed quick paging block;
instructions for encoding the compressed quick paging block to generate an encoded quick paging packet;
instructions for generating at least one Orthogonal Frequency Division Multiplex (OFDM) symbol having at least a portion of the encoded quick paging block; and
instructions for transmitting the at least one OFDM symbol: wherein the instructions for compressing the quick paging block comprises:
instructions for determining a number of asserted quick paging bits from the plurality of quick paging bits; and
instructions for generating successive fields indicating positions of the asserted quick paging bits within the quick paging block if the number of asserted bits is less than a predetermined amount.

37. A non-transitory computer readable medium including computer
readable instructions that may be utilized by one or more processors, the instructions comprising:
instructions for setting a quick paging bit corresponding to the access terminal in a quick paging block having a plurality of bits corresponding to a plurality of access terminals;
instructions for compressing the quick paging block to generate a compressed quick paging block; and
instructions for encoding the compressed quick paging block to generate an encoded quick paging block, wherein the instructions for compressing the quick paging block comprises:
instructions for determining a number of asserted quick paging bits from the plurality of quick paging bits; and
instructions for generating successive fields indicating positions of the asserted quick paging bits within the quick paging block if the number of asserted bits is less than a predetermined amount.

38. A non-transitory computer readable medium including computer readable instructions that may be utilized by one or more processors, the instructions comprising:
  instructions for processing a quick paging packet;
  instructions for decoding the quick paging packet to generate a quick paging block;
  instructions for decompressing the quick paging block; and
  instructions for determining a status of a quick paging bit associated with an access terminal based on an output of the decompressing process,
  wherein the instructions for decompressing the quick paging block comprises: instructions for determining a number of asserted quick paging bits represented in the quick paging block; and
  instructions for examining positions of the asserted quick paging bits in successive fields within the quick paging block to determine whether a quick paging bit associated with an access terminal is asserted.

39. The non-transitory computer readable medium of claim 38, the instructions further comprising:
  instructions for determining a position of an asserted bit in the quick paging block based on an output of the decompressing process; and
  instructions for comparing the position to a position of the quick paging bit associated with the access terminal.

40. A method of processing a quick paging message in a wireless device, the method comprising:
  receiving and decoding a quick paging block in the wireless device; and
  decompressing the decoded quick paging block by determining a number of asserted quick paging bits represented in the quick paging block, and examining positions of the asserted quick paging bits in successive fields within the quick paging block to determine whether a quick paging bit associated with the wireless device is asserted.

41. The method of claim 40, wherein receiving the quick paging block further comprises:
  receiving a quick paging packet that contains the quick paging block and a load control block.

42. The method of claim 41, wherein receiving the quick paging packet comprises receiving an Orthogonal Frequency Division Multiplex (OFDM) symbol having at least a portion of the quick paging packet.

43. The method of claim 40, further comprising:
  determining the status of the quick paging bit by determining a position of an asserted bit in the quick paging block based on an output of the decompressing of the decoded quick paging block, and comparing the position to a position of the quick paging bit associated with the wireless device.

44. An apparatus for processing a quick paging message in a wireless device, the apparatus comprising:
  means for receiving and decoding a quick paging block in the wireless device; and
  means for decompressing the decoded quick paging block by determining a number of asserted quick paging bits represented in the quick paging block, and examining positions of the asserted quick paging bits in successive fields within the quick paging block to determine whether a quick paging bit associated with the wireless device is asserted.

45. The apparatus of claim 44, wherein the means for receiving the quick paging block further comprises:
  means for receiving a quick paging packet that contains the quick paging block and a load control block.

46. The apparatus of claim 45, wherein the means for receiving the quick paging packet comprises means for receiving an Orthogonal Frequency Division Multiplex (OFDM) symbol having at least a portion of the quick paging packet.

47. The apparatus of claim 44, further comprising:
  means for determining the status of the quick paging bit by determining a position of an asserted bit in the quick paging block based on an output of the decompressing of the decoded quick paging block, and comparing the position to a position of the quick paging bit associated with the wireless device.

48. An apparatus for processing a quick paging message in a wireless device, the apparatus comprising:
  a receiver configured to receive a quick paging block in the wireless device;
  a decoder configured to decode the quick paging block; and
  a quick paging block decompress block configured to decompress the decoded quick paging block by determining a number of asserted quick paging bits represented in the quick paging block, and examining positions of the asserted quick paging bits in successive fields within the quick paging block to determine whether a quick paging bit associated with the wireless device is asserted.

49. The apparatus of claim 48, wherein the receiver is further configured to receive a quick paging packet that contains the quick paging block and a load control block.

50. The apparatus of claim 49, wherein the receiver is further configured to receive an Orthogonal Frequency Division Multiplex (OFDM) symbol having at least a portion of the quick paging packet.

51. The apparatus of claim 48, further comprising:
  a status determination block configured to determine the status of the quick paging bit by determining a position of an asserted bit in the quick paging block based on an output of the quick paging block decompress block, and comparing the position to a position of the quick paging bit associated with the wireless device.

52. A non-transitory computer readable medium including computer readable instructions that may be utilized by one or more processors, the instructions comprising:
  instructions for receiving and decoding a quick paging block in a wireless device; and
  instructions for decompressing the decoded quick paging block by determining a number of asserted quick paging bits represented in the quick paging block, and examining positions of the asserted quick paging bits in successive fields within the quick paging block to determine whether a quick paging bit associated with the wireless device is asserted.

53. An apparatus for generating a quick paging message for use by an access terminal, the apparatus comprising:
  a quick paging block generator configured to assert a quick paging bit corresponding to the access terminal and configured to generate a quick paging block having at least the quick paging bit and a distinct quick paging bit corresponding to a distinct access terminal; and
  a compression block coupled to the quick paging block generator, the compression block configured to determine a number of asserted quick paging bits from a plurality of quick paging bits and to generate successive fields indicating positions of the asserted quick paging bits within the quick paging block if the number of asserted bits is less than a predetermined amount.

54. The apparatus of claim 53, further comprising:
an encoder coupled to the quick paging block generator and configured to generate an encoded quick paging packet based on the quick paging block; and
a transmit processor coupled to the encoder and configured to generate at least one Orthogonal Frequency Division Multiplex (OFDM) symbol having at least a portion of the encoded quick paging packet.

55. The apparatus of claim 54, wherein the compression block is configured to compress the quick paging block and to generate a compressed quick paging block; and wherein the encoder is coupled to the compression block and is configured to generate the encoded quick paging packet based on the compressed quick paging block.

56. The apparatus of claim 53, further comprising:
a load control module configured to generate load control block having at least one bit distinct from a quick paging bit; and
an aggregator coupled to the quick paging block generator and the load control block and configured to aggregate the quick paging block with the load control block; wherein the encoder is configured to encode an aggregated output of the aggregator.

57. The apparatus of claim 54, further comprising a transmitter coupled to the encoder and configured to time division multiplex the encoded quick paging packet over at least one channel with other information.

58. A method for generating a quick paging message for use by an access terminal, the method comprising:
asserting a quick paging bit corresponding to the access terminal and configured to generate a quick paging block having at least the quick paging bit and a distinct quick paging bit corresponding to a distinct access terminal; and
determining a number of asserted quick paging bits from a plurality of quick paging bits and to generate successive fields indicating positions of the asserted quick paging bits within the quick paging block if the number of asserted bits is less than a predetermined amount.

59. The method of claim 58, further comprising:
generating an encoded quick paging packet based on the quick paging block; and
generating at least one Orthogonal Frequency Division Multiplex (OFDM) symbol having at least a portion of the encoded quick paging packet.

60. The method of claim 59, further comprising:
compressing the quick paging block to generate a compressed quick paging block; and
generating the encoded quick paging packet based on the compressed quick paging block.

61. The method of claim 58, further comprising:
generating a load control block having at least one bit distinct from a quick paging bit;
aggregating the quick paging block with the load control block; and
encoding the aggregated quick paging block and load control block.

62. The method of claim 59, further comprising:
transmitting the encoded quick paging block using time division multiplexing of the encoded quick paging packet over at least one channel with other information.

63. An apparatus for generating a quick paging message for use by an access terminal, the apparatus comprising:
means for asserting a quick paging bit corresponding to the access terminal and configured to generate a quick paging block having at least the quick paging bit and a distinct quick paging bit corresponding to a distinct access terminal; and
means for determining a number of asserted quick paging bits from a plurality of quick paging bits and to generate successive fields indicating positions of the asserted quick paging bits within the quick paging block if the number of asserted bits is less than a predetermined amount.

64. The apparatus of claim 63, further comprising:
means for generating an encoded quick paging packet based on the quick paging block; and
means for generating at least one Orthogonal Frequency Division Multiplex (OFDM) symbol having at least a portion of the encoded quick paging packet.

65. The apparatus of claim 64, further comprising:
means for compressing the quick paging block to generate a compressed quick paging block; and
means for generating the encoded quick paging packet based on the compressed quick paging block.

66. The apparatus of claim 63, further comprising:
means for generating a load control block having at least one bit distinct from a quick paging bit;
means for aggregating the quick paging block with the load control block; and
means for encoding the aggregated quick paging block and load control block.

67. The apparatus of claim 64, further comprising:
means for transmitting the encoded quick paging block using time division multiplexing of the encoded quick paging packet over at least one channel with other information.

68. A non-transitory computer readable medium including computer readable instructions that may be utilized by one or more processors, the instructions comprising:
asserting a quick paging bit corresponding to an access terminal and configured to generate a quick paging block having at least the quick paging bit and a distinct quick paging bit corresponding to a distinct access terminal; and
determining a number of asserted quick paging bits from a plurality of quick paging bits and to generate successive fields indicating positions of the asserted quick paging bits within the quick paging block if the number of asserted bits is less than a predetermined amount.

\* \* \* \* \*